(12) United States Patent
Canis

(10) Patent No.: US 8,880,613 B2
(45) Date of Patent: Nov. 4, 2014

(54) SYSTEM AND METHOD FOR MANAGING MAIL MESSAGES

(76) Inventor: Randy L. Canis, Chesterfield, MO (US)

( * ) Notice: Subject to any disclaimer, the term of this patent is extended or adjusted under 35 U.S.C. 154(b) by 1648 days.

(21) Appl. No.: 11/138,087

(22) Filed: May 26, 2005

(65) Prior Publication Data

US 2006/0031358 A1 Feb. 9, 2006

Related U.S. Application Data

(60) Provisional application No. 60/574,791, filed on May 27, 2004.

(51) Int. Cl.
*G06F 15/16* (2006.01)
*H04L 12/58* (2006.01)
*H04L 29/08* (2006.01)

(52) U.S. Cl.
CPC .............. *H04L 67/322* (2013.01); *H04L 51/26* (2013.01)
USPC ......... 709/206; 705/7.15; 705/7.21; 705/319; 715/752; 715/706

(58) Field of Classification Search
USPC ................................. 709/204–207; 379/93.01
See application file for complete search history.

(56) References Cited

U.S. PATENT DOCUMENTS

| | | | |
|---|---|---|---|
| 5,694,616 A | 12/1997 | Johnson et al. | |
| 5,764,898 A | 6/1998 | Tsuji et al. | |
| 6,047,260 A * | 4/2000 | Levinson | 705/7.15 |
| 6,047,315 A | 4/2000 | Tsuji et al. | |
| 6,134,582 A | 10/2000 | Kennedy | |
| 6,163,802 A | 12/2000 | Lin et al. | |
| 6,212,553 B1 * | 4/2001 | Lee et al. | 709/206 |
| 6,381,580 B1 * | 4/2002 | Levinson | 705/7.13 |
| 6,434,603 B1 | 8/2002 | Tsuji et al. | |
| 6,732,185 B1 | 5/2004 | Reistad | |
| 6,832,244 B1 | 12/2004 | Raghunandan | |
| 6,898,621 B2 * | 5/2005 | Kuriki et al. | 709/206 |
| 6,941,304 B2 * | 9/2005 | Gainey et al. | 1/1 |
| 7,007,067 B1 * | 2/2006 | Azvine et al. | 709/206 |
| 7,020,254 B2 * | 3/2006 | Phillips | 379/114.04 |
| 7,027,996 B2 * | 4/2006 | Levinson | 705/7.26 |
| 7,107,544 B1 * | 9/2006 | Luke | 715/752 |
| 7,120,865 B1 * | 10/2006 | Horvitz et al. | 715/210 |
| 7,305,441 B2 * | 12/2007 | Mathewson et al. | 709/206 |
| 7,809,794 B2 * | 10/2010 | Fellenstein et al. | 709/206 |
| 8,181,124 B2 * | 5/2012 | Ebert et al. | 715/864 |
| 2002/0032738 A1 | 3/2002 | Foulger et al. | |
| 2002/0082919 A1 | 6/2002 | Landau et al. | |
| 2002/0120702 A1 | 8/2002 | Schiavone et al. | |
| 2002/0138605 A1 | 9/2002 | Hole | |
| 2003/0078983 A1 | 4/2003 | Sullivan et al. | |
| 2003/0146921 A1 * | 8/2003 | Taniguchi et al. | 345/629 |
| 2003/0195781 A1 | 10/2003 | Sakaguchi et al. | |

(Continued)

FOREIGN PATENT DOCUMENTS

WO WO-00/26827 A1 * 5/2000 .............. G06F 17/60

*Primary Examiner* — Greg C Bengzon
(74) *Attorney, Agent, or Firm* — Randy Canis

(57) ABSTRACT

A method for managing a plurality of mail messages that are sent and received, the method comprising obtaining a message information portion for each of the plurality of mail messages, associating a default priority interval with each of the plurality of mail messages, and generating and associating an existing priority interval for each of the plurality of mail messages when the message information portion of each of the plurality of mail messages matches a selection criteria.

9 Claims, 31 Drawing Sheets

(56) References Cited

U.S. PATENT DOCUMENTS

| | | |
|---|---|---|
| 2003/0195782 A1 | 10/2003 | Sakaguchi et al. |
| 2003/0204452 A1 | 10/2003 | Wheeler |
| 2004/0054743 A1* | 3/2004 | McPartlan et al. ............ 709/206 |
| 2004/0088360 A1 | 5/2004 | Caughey |
| 2004/0243679 A1* | 12/2004 | Tyler ............................ 709/206 |
| 2005/0004989 A1 | 1/2005 | Satterfield et al. |
| 2005/0004990 A1 | 1/2005 | Durazo et al. |
| 2005/0015451 A1 | 1/2005 | Sheldon et al. |
| 2005/0033810 A1* | 2/2005 | Malcolm ....................... 709/206 |
| 2005/0188041 A1* | 8/2005 | Kuriki et al. .................. 709/206 |
| 2006/0004869 A1* | 1/2006 | Yuster et al. ................ 707/104.1 |

\* cited by examiner

| Row Pointer | Subject of Last User Message | Date of Last User Message | Subject of Last Third Party Message? | Date of Last TP Message | Identity of Last Third Party? | Message Pointer |
|---|---|---|---|---|---|---|
|  |  |  |  |  |  |  |
|  |  |  |  |  |  |  |
|  |  |  |  |  |  |  |
|  |  |  |  |  |  |  |
| Row Pointer | Subject of Last User Message | Date of Last User Message | Subject of Last Third Party Message? | Date of Last TP Message | Identity of Last Third Party? | Message Pointer |

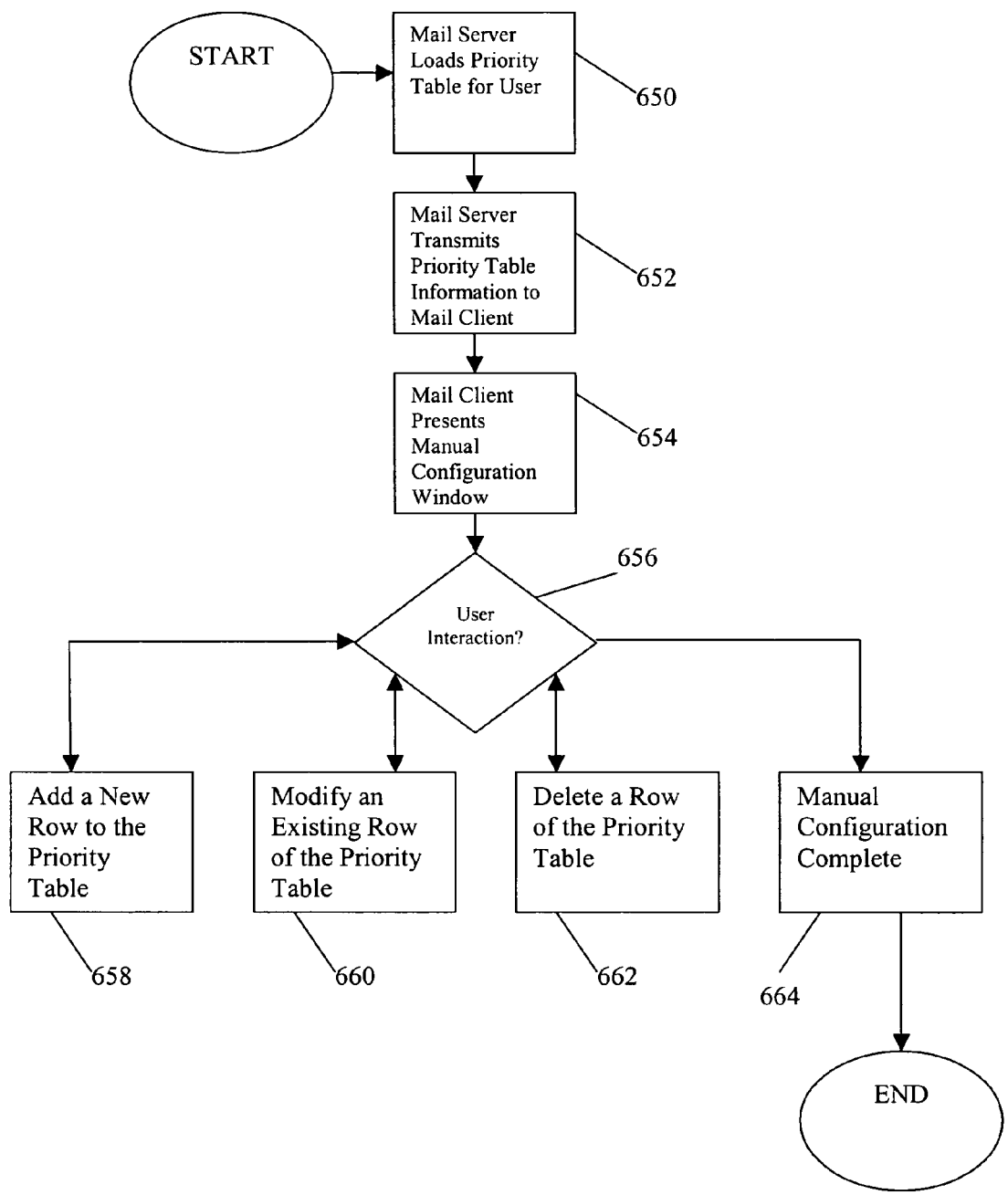

SYSTEM AND METHOD FOR MANAGING MAIL MESSAGES

CROSS-REFERENCE TO RELATED APPLICATION

This application claims the benefit of U.S. Provisional Patent Applications entitled "System and Nethod for Message Prioritization", Ser. No. 60/574,791, filed 27 May 2004 by Randy L. Canis which is herein incorporated by reference.

BACKGROUND OF THE INVENTION

Electronic messaging systems are well known in the art for providing its users with the means for electronic communication with other persons, whereby the users preferably communicate by sending mail messages in the form of electronic mail (i.e., e-mail). As of the date of the present invention, the most popular messaging systems for e-mail are Microsoft® Outlook used in combination with a pop server and the free web based mail service provided by Yahoo® and Google®.

None of the messaging systems in the art adequately assist users in combating the plethora of incoming and outgoing mail messages that are received on a daily basis. Accordingly, there is a need in the art to provide an electronic messaging system that assists users in managing mail messages to enable users to timely receive and respond to mail messages while avoid losing track of the current status of the sending and receiving mail messages by various mail recipients.

SUMMARY OF THE INVENTION

The message prioritization system comprises a mail server connected to a mail client by a communication network. The message prioritization system sends and receives communications in the form of mail messages for its users.

The mail server is an application that receives and processes incoming mail messages from a third party or other user of the message prioritization system on behalf of the user and transmits outgoing mail messages from the user for delivery to third parties and other users. The mail server operates on a computer server.

The mail client permits the user to graphically interface with the mail server to review, respond, compose mail messages and preferably operates on a user computer.

The mail server communicates with a priority database and a communication database to track and prioritize the mail messages sent and received by the user, third parties and other users. Third parties communicate with message prioritization system through the communication network and computer server.

The priority database enables users of message prioritization system to individually monitor incoming and outgoing mail messages through selection criteria so as to determine what action the user may wish to take based on the sending and receiving of mail messages. Each user has their own priority table in priority database for a particular user account defining the characteristics of mail messages that it parses and the timing associated therewith. Priority table is comprised of one or more priority table rows, with each row performing a separate parsing operation.

Multiple communication tables may be included in the communication database. Each user has their own communication table for a particular user that tracks the sending and receiving of mail messages according to the user's priority table. Priority table rows act as a monitor of incoming and outgoing mail messages, while communication table rows act as the tracker of incoming and outgoing mail messages.

A priority interval determines the period of time that message prioritization system will wait from the time and date a mail message was sent or received before it escalates the level of notification to the user. A priority group association is used to group together a number of priority table rows so that each of them have identical priority intervals.

In one embodiment, a method for managing a plurality of mail messages that are sent and received is described, the method comprising obtaining a message information portion for each of the plurality of mail messages, associating a default priority interval with each of the plurality of mail messages, and generating and associating an existing priority interval for each of the plurality of mail messages when the message information portion of each of the plurality of mail messages matches a selection criteria.

In another embodiment, a method for transmitting a mail message is described, the mail message comprising a message body, the method comprising entering a message into the message body of the mail message on a mail client, defining a priority interval for the mail message, and transmitting the mail message to the third party or other user without including the priority interval with the mail message.

In yet another embodiment, a method for managing a plurality of mail messages that are sent and received is described, the method comprising means for distinguishing and relating the plurality of mail messages according to a selection criteria and means for generating or associating a priority means for each of the plurality of mail messages based on a match of each of the plurality of mail messages to the selection criteria, wherein the priority means identifies a length of time since each of the plurality of mail messages was last sent or received.

BRIEF DESCRIPTION OF THE DRAWINGS

FIG. 14 is a block diagram of the communication table of the present invention.

FIG. 32 is a flowchart of the method of manually configuring the configuration of the priority table of the present invention.

DETAILED DESCRIPTION OF THE INVENTION

Figure 1:
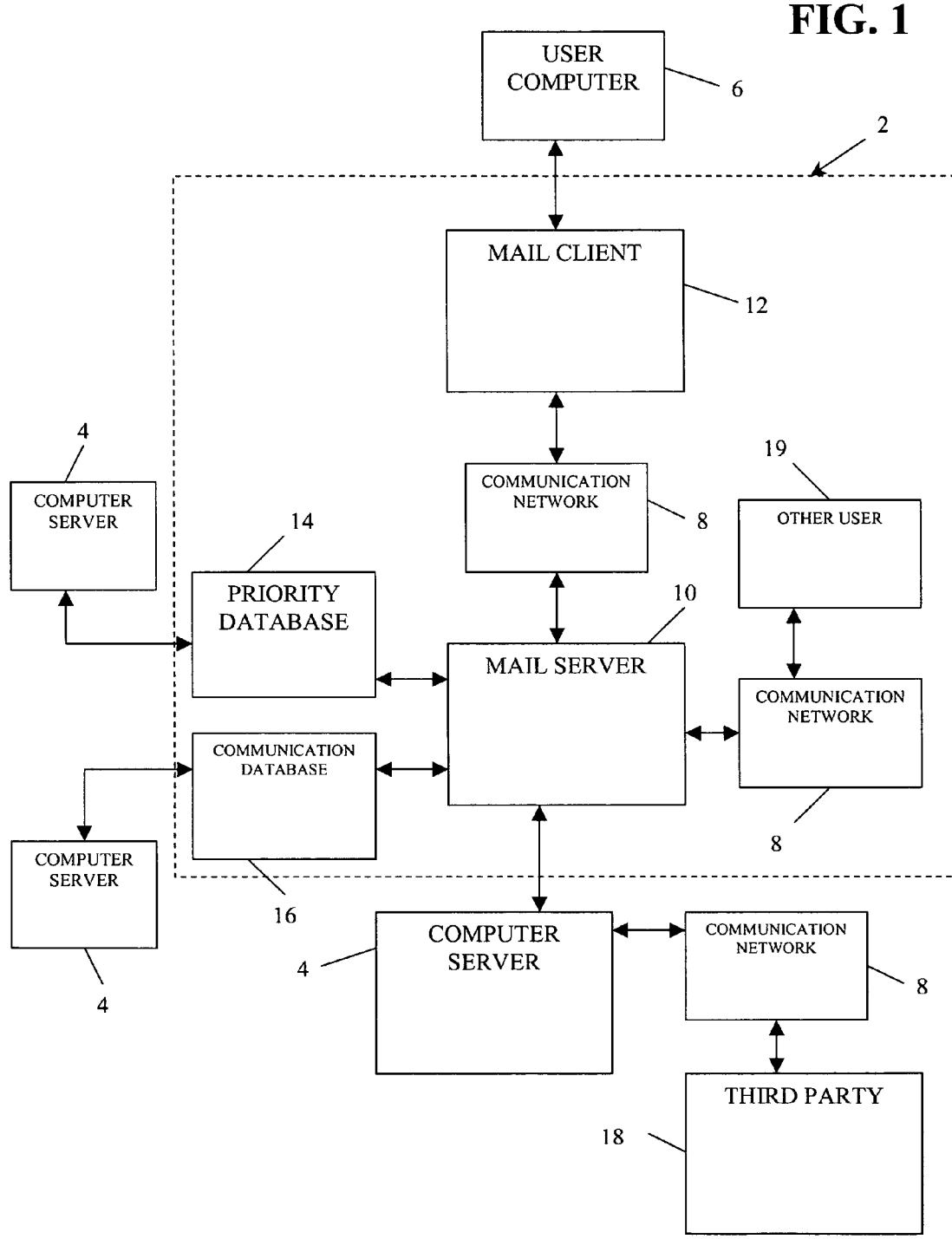
FIG. 1 is a block diagram of to components of a message prioritization system of the present invention.

Referring to the drawings, the preferred embodiment of a method and system for message prioritization is illustrated in FIGS. 1-32.

Figure 10:
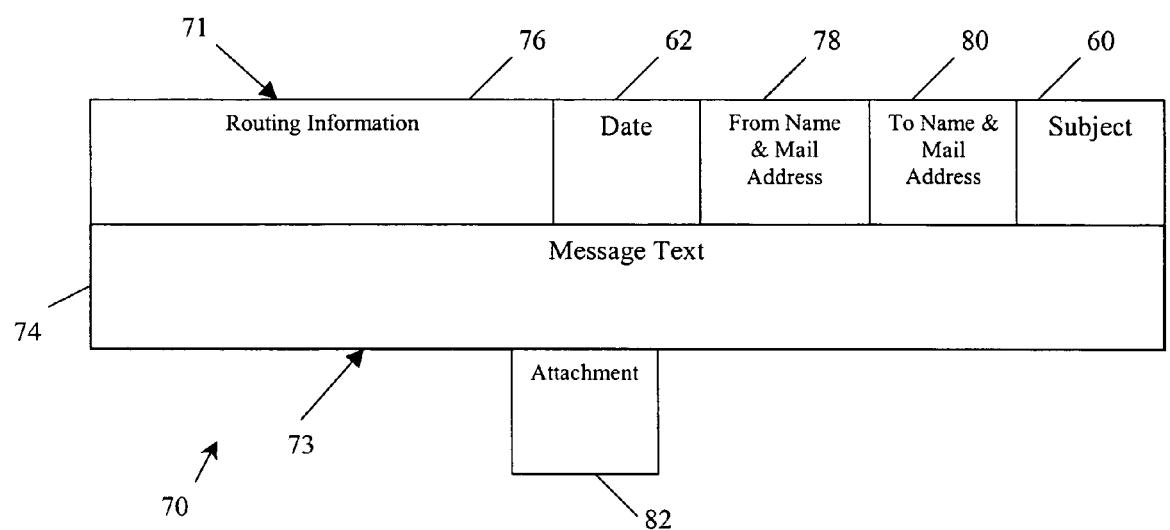
FIG. 10 is a block diagram of the mail message of the present invention.

Referring to FIG. 1, an exemplary embodiment of the components of the message prioritization system 2 is shown to first comprise a mail server 10 connected to mail client 12 by communication network 8. Message prioritization system 2, as described in greater detail below, includes all necessary hardware and software applications to send and receive communications in the form of mail message 70 (as shown in FIG. 10) for its users. It should be appreciated that message prioritization system 2 may use the SMTP (Simple Mail Transfer Protocol) or ESMTP (extended SMTP) protocol for sending mail messages 70, the POP3 (Post Office Protocol 3) or IMAP (Internet Message Access Protocol) protocol for receiving mail messages 70, or by other protocols for sending and receiving mail messages 70 as will be appreciated in the art of electronic mail communication. It should also be appreciated that the protocol(s) ultimately used with the present invention may depend on whether the message prioritization system 2 is implemented to be used independently as a stand-alone program, made integral with an existing messaging system (e.g., Yahoo.com), or created as a plug-in to an existing messaging system (e.g., Microsoft Outlook). Further implementations of the present invention are also felt to fall within the scope of the present invention.

Mail server 10 is preferably a software application that receives and processes incoming mail messages 70 from a third party 18 or other user 19 of message prioritization system 2 on behalf of the user and transmits outgoing mail messages 70 from the user for delivery to third parties 18 and other users 19. In the preferred embodiment, mail server 10 is a web-based software application program acting as a server in a client/server relationship. Mail server 10 is preferably implemented as software and written in a combination of C programming and UNIX scripting languages, but may be written in one or more other languages as will be appreciated in the art of Internet server programming. The operation of mail server 10 is described in greater detail below.

Mail server 10 operates on a computer server 4. Computer server 4 is preferably a multitasking computer system capable of handling nearly simultaneous or simultaneous user requests from multiple users. Computer server 4 may be a personal computer or a server, or multiple combinations thereof such as four servers operating synchronously.

Mail client 12 permits the user to graphically interface with mail server 10 to review, respond, compose mail messages 70 and preferably operates on a user computer 6. Preferably, the user interfaces with the mail client 12 through one or more windows of a web browser operating on user computer 6, but it should be appreciated that mail client 12 may also be a stand alone program that runs on the operating system of user computer 6 or otherwise be implemented as an interfacing means such that a user may send and receive mail messages 70. It should also be appreciated that mail client 12 may be an existing user mail program in combination with a plug-in that acts jointly as mail client 12. Other implementations and combinations of the foregoing should be appreciated by a computer programmer with skill in the art of computer software.

User computer 6 is preferably a personal computer with hard disk drive, CPU, mother board, computer monitor, mouse and keyboard that runs Microsoft Windows XP operating system. However, other computers and other devices with different configurations of hardware and/or software are felt to fall within the scope of the present invention as user computer 6. In addition, other portable devices such as person digital assistants (PDAs), mobile phones and BlackBerry® devices are also felt to fall within the scope of the present invention.

Communication network 8 is preferably a global data network such as the Internet, but may also be other types of networks including LANs and WANs that are capable of providing data from one resource to another. Preferably, data traveling over communication network 8 is in encrypted form, with various methods of encrypting data are well-known in the art of cryptography.

Mail server 10 communicates with priority database 14 and communication database 16 to prioritize and track mail messages 70 sent and received by the user, third parties 18 and other users 19. Priority database 14 operates on computer server 4, which may optionally operate on the same computer server 4 as mail server 10. Communication database 16 also operates on computer server 4, which may also optionally operates on the same computer server 4 as mail server 10 or priority database 2. Mail server 10, priority database 14 and communication database 16 are described in greater detail below.

Third parties 18 communicate with message prioritization system 2 through communication network 8 and computer server 4. Third parties 18 utilize their own mail clients 12 and mail servers 10 so that they can communicate with a user of message prioritization system 2. However, third parties 18 need not have priority database 14 and communication database 16 for the user to utilize the present invention. By such implementation, third parties will not know of user's use of system, which may be undesirable. In addition, since the user defines their own priority for certain mail messages 70 from various parties, the third parties 18 determination of their priority is unimportant to the user's implementation of the present invention.

Figure 2:
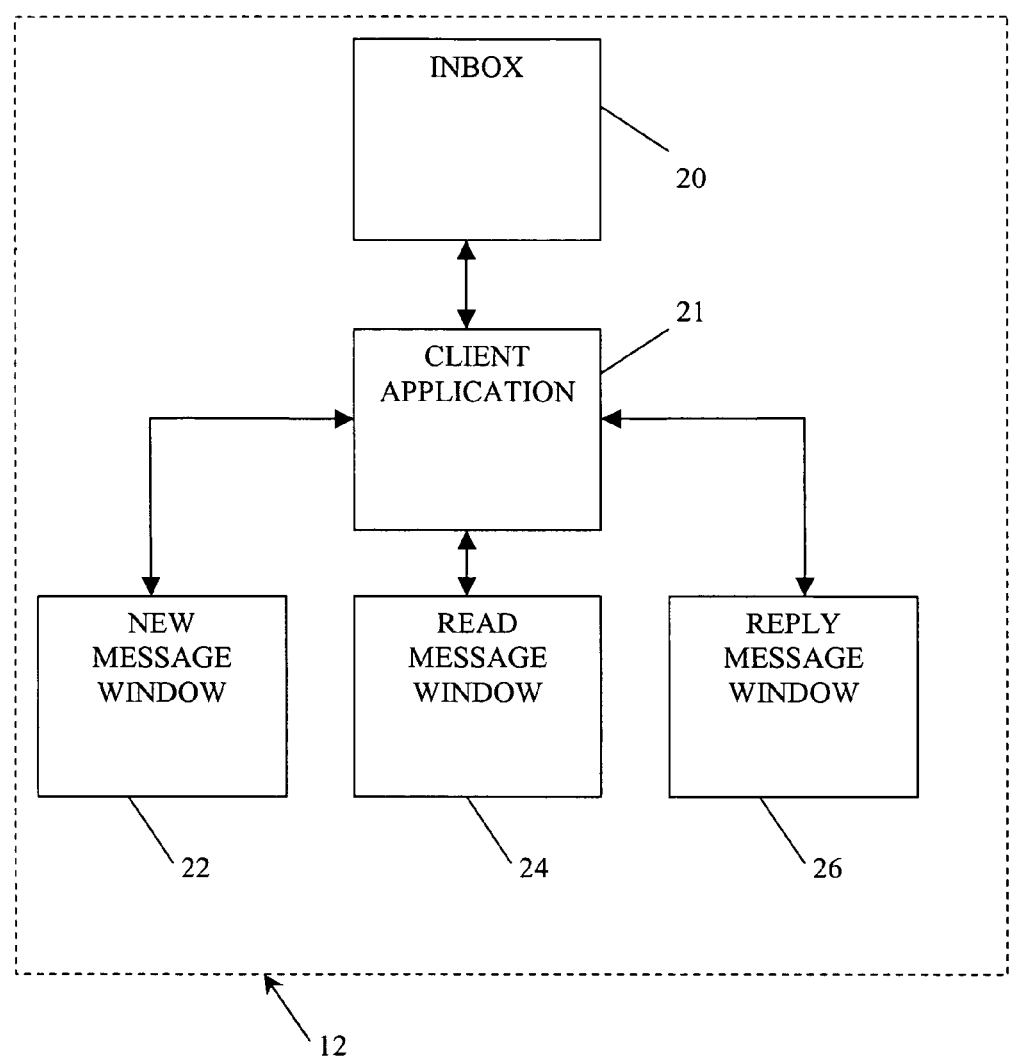
FIG. 2 is a block diagram of the mail client of the present invention.

Referring to FIG. 2, an exemplary implementation of mail client 12 is shown to first comprise client application 21 that operates on user computer 6 and is preferably a software application that the user launches to interact with mail server 10 and message prioritization system 2. By default, the user is preferably presented with inbox 20 after the user logs into message prioritization system 2 by use of mail client 12. Inbox 20 provides a means for presenting received mail messages 70 to the user of message prioritization system 2 and permitting the user to interact with mail client 12. It should be appreciated that mail client 12 may launch a different user interface by default or at the user's selective direction. The preferred presentation of inbox 20 is described in greater detail below.

Mail client 12, depending on the user's interaction with mail client 12 through inbox 20, may launch and present new message window 22, read message window 24 or reply message window 26 to the user. New message window 22 enables the user to compose new mail messages 70 to send to third parties 18 and other users 19. Read message window 24 provides the user with an opportunity to read a received mail message 70 from third parties 18 and other users 19. Upon reading a particular mail message 70, the user is provided with an opportunity to reply to the received mail message 70 when presented with reply message window 26. New message window 22, read message window 24 and reply message window 26 are described in greater detail below. It should appreciated in that the term "window" in the foregoing description means a graphical user presentation viewed by the user to relay the desired information and may be implemented in another form. However, other presentations of the information to the user are also felt to fall within the present invention.

Optionally, mail client 12 may be further comprised of an outbox (not shown) connected to mail client 12. The outbox provides a means for mail client 12 to retain and present stored copies of mail messages 70 sent from the user to third parties 18 and other users 19 as should be appreciated in the art of electronic messaging. However, message prioritization system 2 need not have an outbox that retains and later presents mail messages 70 to provide the functionality of the present invention.

Figure 3:
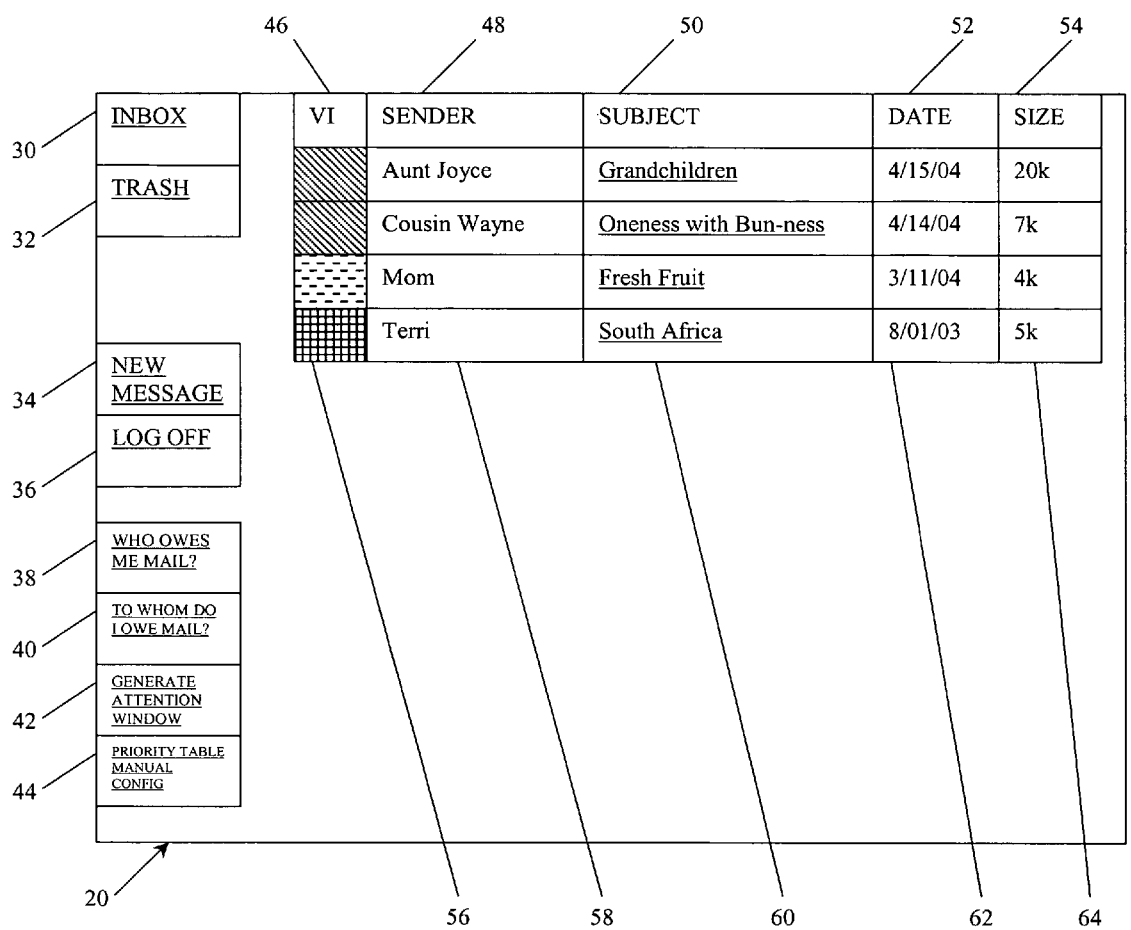
FIG. 3 is a block diagram of the inbox of the present invention.

Referring to FIG. 3, a preferred representation of inbox 20 as presented to the user with exemplary mail messages 70 and is shown to first comprise an inbox link 30. Inbox link 30 preferably allows the user to refresh inbox 20, such that inbox 20 will re-present all mail messages 70 including those newly received. Inbox 20 may alternatively refresh itself every 30 seconds, minute, or other time interval to present the user with newly received mail messages 70 in inbox 20.

Inbox 20 is further preferably comprised of trash link 32, which provides the user a listing of all mail messages 70 scheduled for deletion and the opportunity to review, purge and/or restore previously deleted mail messages 70 from mail server 10. The operation and configuration of trash link 32 (i.e., a "trash can") are well known in the art of electronic messaging.

New message link 34 of inbox 20 launches new message window 22 and provides the user with the opportunity to compose new mail messages 70 to be sent to third parties 18 and other users 19. The preferred method of composing new mail messages 70 is described in greater below.

Inbox 20 further comprises log off link 36 which enables the user to log off of (i.e., sign out of) message prioritization system 2. By having the user log off of message prioritization system 2, the user ensures greater security in that unauthorized persons will not access the user's account with message prioritization system 2. The preferred method of logging off of message prioritization system 2 is described in greater detail below.

When the user clicks who owes me mail link 38 of inbox 20, message prioritization system 2 generates a list for the user of the third parties 18 and other users 19 that are due to send mail messages 70 to the user. The preferred method of generating the aforementioned list is described in greater detail below.

The user's selection of to whom do I owe mail link 40 generates for the user a list of third parties 18 and other users to whom the user received mail messages 70 and the user owes the transmission of a further mail message 70. The preferred method of generating the aforementioned list is described in greater detail below.

The user may also select generate attention window link 42 of inbox 20 to create a window or other user interface to identify mail messages 70 that are beyond their respective priority intervals 110 and a visual indicator 56 with respect to same. The preferred method of foregoing operation is described in greater detail below.

The user may also manually adjust the tracking of mail messages 70 by clicking on priority table manual config link 44 of inbox 20. The preferred method of manual configuration is described in greater detail below.

Visual indicator column 46 of inbox 20 presents visual indicators 56 for respective mail messages 70. Visual indicators 56 graphically represent to the user how overdue a response is to a particular mail message 70 (i.e., the priority level). Preferably, visual indicators 56 are generated based on calculations made with respect to priority interval 110, the process of which is described in greater detail below. Inbox 20 preferably represents mail messages 70 sorted by most overdue when user clicks on visual indicator column 46. When the user mouses over on a visual indicator 56, information regarding the sender and receiver of previous mail messages 70 is presented to the user. Various presentations of visual indicators 56 to the user are shown in the figures and described in greater detail below and yet other implementations of visual indicators 56 are also felt to fall within the scope of the present invention.

Inbox 20 is further shown to comprise sender column 48, which presents a sender 58 of each mail message 70 in inbox 20. Preferably, only the identity of third party 18 or other user 19, and not the mail address, is shown to the user in inbox 20. However, it should be appreciated that the mail address of third party 18 or other user 19 may additionally or alternatively be shown in inbox 20. In addition, when user clicks on sender column 48, inbox 20 re-presents mail messages 70 sorted alphabetically by sender 58.

Subject column 50 of inbox 20 presents to the user subject 60 of mail messages 70 in inbox 20. Subject 60 typically identifies the content of mail message 70 and is entered by the transmitter of mail message 70. The user may click on any subject 60 to read the selected mail message 70 as is described in greater detail below. In addition, when user clicks on subject column 50, inbox 20 re-presents mail messages 70 sorted alphabetically by subject 60.

Date column 52 of inbox 20 presents to the user dates 62 of mail messages 70 in inbox 20. Date 62 is the date and time that mail message 70 was sent to the user, but it should be appreciated that only the date and not the time may be presented to the user by use of inbox 20. Preferably by default, mail messages 70 in inbox 20 are sorted by date 62. When user clicks on date column 52, mail messages 70 are alternatively sorted in date and reverse date order.

Size column 54 of inbox 20 presents to the user sizes 64 of mail messages 70 in inbox 20, which indicates the number of bytes that mail message 70 occupies on mail server 10. When user clicks on size column 54, mail messages 70 are alternatively sorted by largest to smallest and smallest to largest size 64.

It should also be appreciated that when the user exceeds the number of mail messages 70 that may be displayed at one time to user in a single window, that scrolling and/or several successive screens may be needed to present all mail messages 70 to the user. Accordingly, inbox 20 may further comprise navigation controls (not shown) to allow scrolling or viewing of additional screens.

Figure 4:
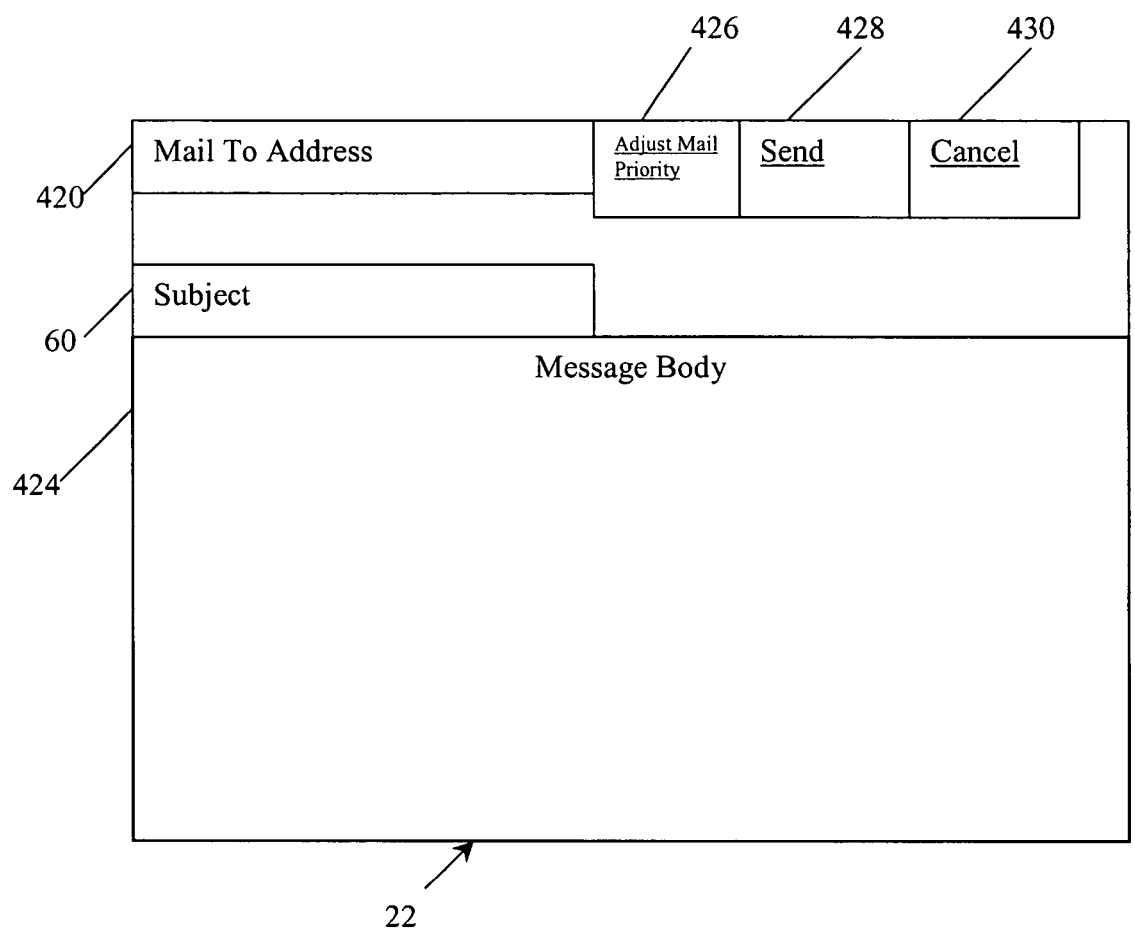
FIG. 4 is a block diagram of the new message window of the present invention.

Referring to FIG. 4, an exemplary embodiment of a new message window 22 is shown to first comprise mail to address 420. Mail to address 420 is the transmission address (e.g., e-mail address) for the desired recipient of mail message 70 such as third party 18 or other user 19.

New message window 22 further comprises subject 60, which permits the user to enter in a description of mail message 70. Accordingly, in new message window 22 user provides the text for subject 60.

The user enters the text of mail message 70 into message body 424. Message body 424 is usually the primary purpose for transmitting mail message 70 from a sender to a recipient, as it provides information from one party to the other. It should be appreciated that the user may complete mail to address 420, subject 60 and message body 424 in any order.

At any time prior to transmitting mail message 70, the user may adjust the priority of mail message 70 by clicking adjust mail priority link 426. The preferred method of adjusting the priority of mail message 70 is described in greater detail below.

When the user is ready to transmit mail message 70 to third party 18 or other users 19, user clicks send link 428 to initiation transmission. If the user wants to cancel mail message 70, the user clicks on cancel link 430.

Figure 5:
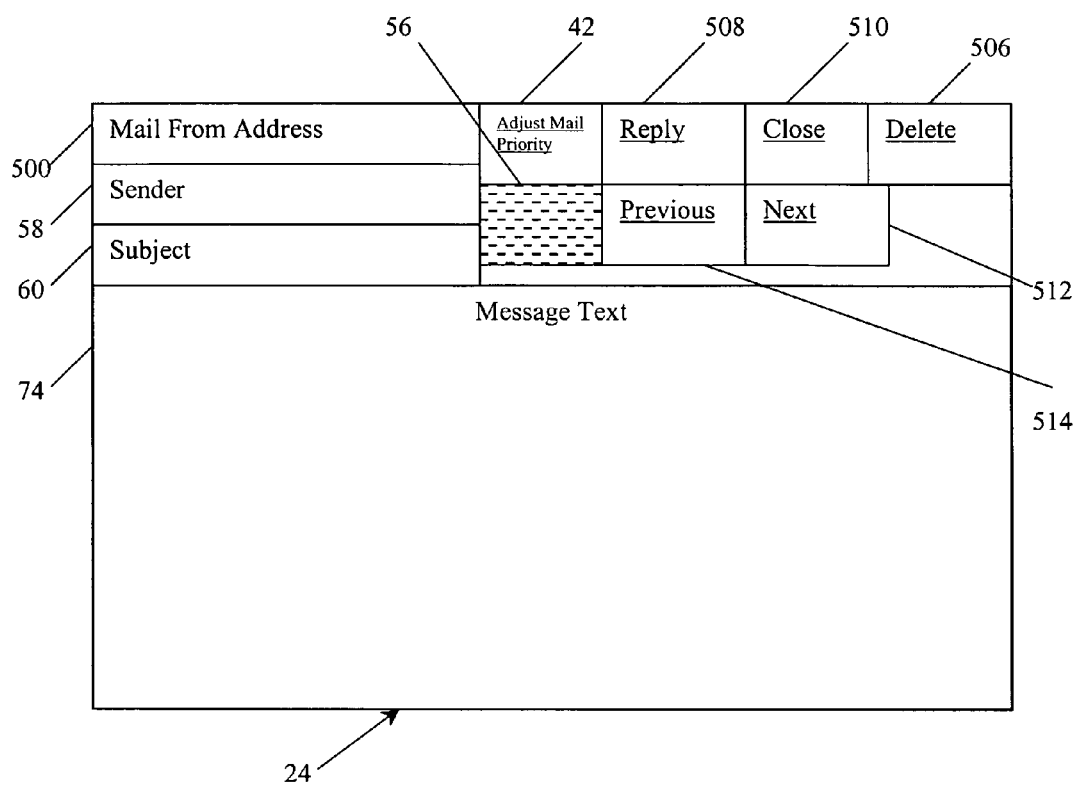
FIG. 5 is a block diagram of the read message window of the present invention.

Referring to FIG. 5, an exemplary embodiment of read message window 24 is shown to comprise mail from address 500 which presents to the user the address of the person transmitted the selected mail message 70, while sender 58 identifies the person who transmitted mail message 70 to the user.

The user may read subject 60 and message text 74 of mail message 70 to determine the basis for transmission of mail message 70 by third party 18 or other user 19 to the user. Message text 74 provides to the user textual information directed to the user.

The user can determine the timeliness of action with respect to a particular mail message 70 by the user, third party 18 or other user 19 by viewing visual indicator 56.

In addition, user can adjust the timing for responding to mail message 70 by clicking on adjust mail priority link 42 as is described in greater detail below.

If the user is ready to respond to mail message 70, the user clicks on reply link 70. The user clicks close link 510 when the user wants to close read message window 24. If user wants to view the next mail message 70 in inbox 20, the user clicks next link 512. The user clicks previous link 514 when the user wants to review previous mail message 70 in inbox 20.

Finally, the user may delete mail message 70 by clicking on delete link 506. Upon deletion, preferably mail message 70 will no longer be accessible to the user and is put in the trash can. The user may also permanently delete mail messages 70 from message prioritization system 2 as described in further detail below.

Figure 6:
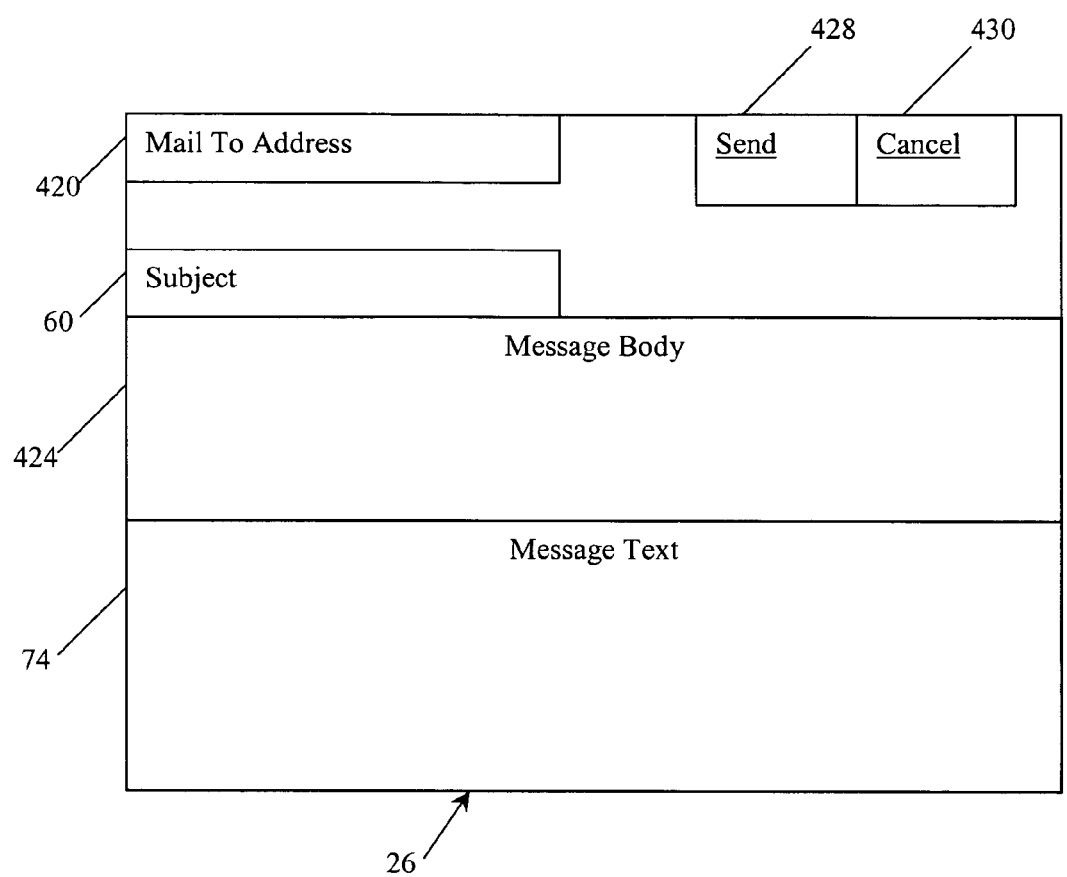
FIG. 6 is a block diagram of the reply message window of the present invention.

Referring to FIG. 6, an exemplary embodiment of reply message window 26 is shown to first comprise mail to address 420 which contains addresses of third parties 18 or other users 19 to which mail message 70 will be transmitted.

Message text 74 contains the text of the previously received mail message 70, while message body 424 allows the user to provide new information relative to the previously received mail message 70.

When the user is ready to transmit mail message 70, the user clicks send link 428. If the user does not want to transmit mail message 70, he user clicks cancel link 430 which returns the user to read window 24.

Figure 7:
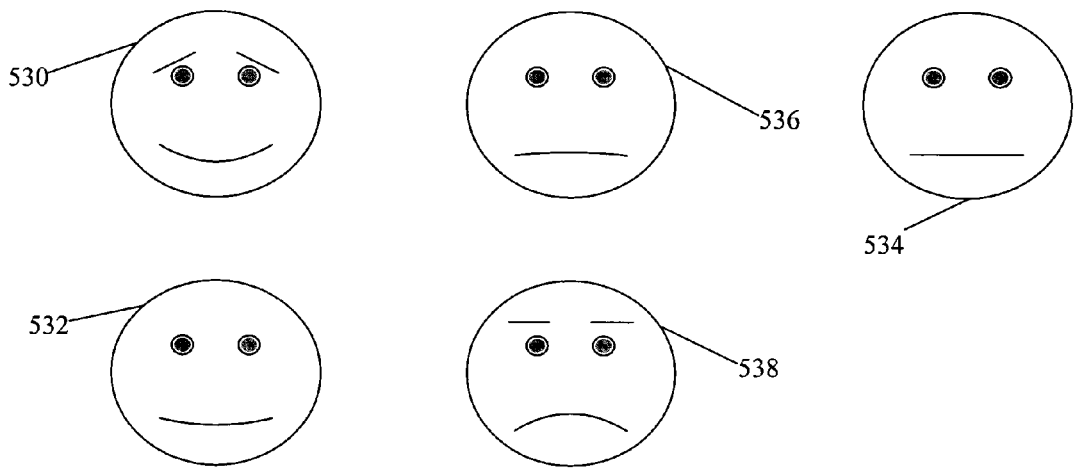
FIG. 7 is a first group of visual indicators of the present invention.

Referring to FIG. 7, a first series of visual indicators 56 are shown to comprise a first face 530. First face 530 may be used to indicate to the user that the associated mail message 70 was recently received and the user is within priority interval 110 for response. Second face 532 is used to indicate that associated mail message 70 is one beyond priority interval 110 (e.g., a priority level of one) for responding to mail message 70. Third face 534 is used to indicate that associated mail message 70 is twice beyond priority interval 110 (e.g., a priority level of two) for responding to mail message 70. Fourth face 536 is used to indicate that associated mail message 70 is three times beyond priority interval 110 (e.g., a priority level of three) for responding to mail message 70. Fifth face 538 is used to indicate that associated mail message 70 is four times or greater beyond priority interval 110 (e.g., a priority level of four or more) for responding to mail message 70. Once the user responds to mail message 70, preferably no visual indicator 56 is presented to the user. However, it should be appreciated that a different visual indicator 56 may instead be used to indicate to the user that a response has been sent.

Accordingly, the successive faces 530-538 with differing levels of expressiveness relate to the user how overdue the user, third party 18 or other user 19 is with responding to or sending a mail message 70. Other successive visual indicators 56 are described in detail below, and the type of visual indicator is preferably selected by the user as to the desired presentation. In addition, the user may be provided with functionality to select the amount of visual indicators 56 available with respect to priority intervals 110. Finally, other visual indicators 56 may be present to indicate that there is no priority level available for a particular mail message 70 such as a graphical representation of a question mark.

Figure 8:
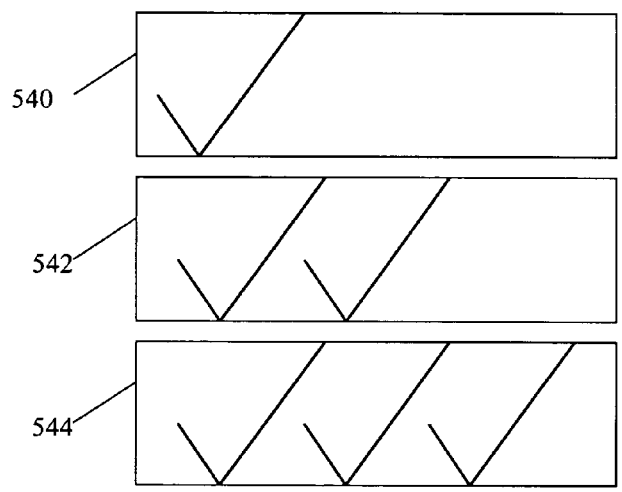
FIG. 8 is a second group of visual indicators of the present invention.

Referring to FIG. 8, three visual indicators 56 are shown in the form of checks 540, 542, and 544. Accordingly, when checks 540, 542, and 544 are used, the user is provided with only three priority levels by use of the visual indicators 58.

Figure 9:
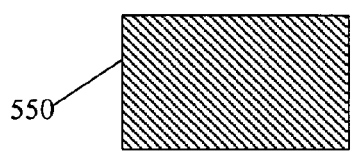
FIG. 9 is a third group of visual indicators of the present invention.
Figure 9:
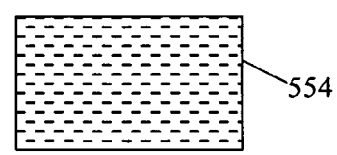
Figure 9:
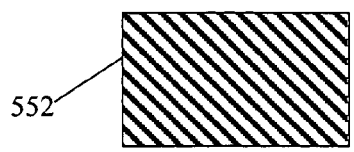
Figure 9:
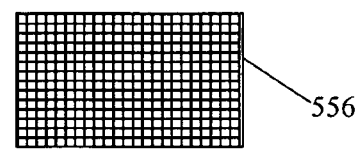

Referring to FIG. 9, four visual indicators 56 are shown in the form of colors 550, 552, 554 and 556. Accordingly, when colors 550, 552, 554 and 556 are used, the user is provided with four levels of visual indicators 56.

Referring to FIG. 10, the preferred embodiment of mail message 70 is shown to comprise message information portion 71 (as described below) and message body portion 73

(i.e., message text 74 and optional attachment 82). Message text 74 contains a textual communication, which may have been composed by the user, third party 18, or other user 19 (i.e., the "sender" of mail message 70) prior to transmission. It should be appreciated that message text 74 may also contain graphical and other elements including markup language. Preferably, mail message 70 is electronic mail (i.e., e-mail), however other means of electronically transferring messaging information such as electronic faxes are also felt to fall within the present invention.

Message information portion 71 first comprises routing information 76, which details the transmission of mail message 70 from server to server. The sender does not complete routing information 72 when composing mail messages 70, as routing information 72 is generated during the transmission of mail message 70. Accordingly, routing information 72 is preferably only visible to the user when reading mail messages 70, but may also be presented to the user when responding to mail messages 70.

Date 62 of mail message 70 details the date and time that mail message 70 was transmitted from the sender. The user preferably does not complete date 62 when composing mail messages 70, as date 62 is generated during the transmission of mail message 70. Therefore, date 62 may only be visible to the user when reading mail messages 70, but is preferably also be presented to the user when responding to mail messages 70 or an anticipated date 62 may be shown to user during the composition of mail message 70.

Date 62 is preferably based on GMT time and date when mail message 70 was sent as it should be appreciated that the various third parties 18 and other users 19 may be in different time zones. However, alternatively date 62 may be based on the time mail message 70 was received by the user, and other methods of handling the complexity associated with date 62 may be used with the present invention. In addition, mail client 12 can also adjust the GMT time for local time, and other configurations of the foregoing are also felt to fall within the present invention.

During the composition of mail messages 70, from name and mail address 78 is not typically capable of being modified. When name and mail address 78 are freely modifiable, the user can alter identification and third party 18 or other user 19 may potentially not be able to respond to a received mail message 70 or be confused as to the identity of the sender. However, preferably third parties 18 and other users 19 obtain the identity and proper mail address of the user when the user transmits mail message 70 to them. The users may determine the sender of a received mail message 70 by reviewing the from name and mail address 78.

The user completes to name and mail address 80 by providing the mail address and optionally the name of the third party 18 or other user 19 during the composition of mail messages 70. User may review the one or more recipients of a particular mail message 70 received by the user by reviewing the to name and mail address 80. The method of completing name and mail address 80 may be enhanced by use of an address book (not shown) or auto-completion of the mail address based on past transmission of mail messages 70. It should also be appreciated that the user may transmit mail message 70 to multiple users by identifying more than one third party 18 and/or other user 19 in to name and mail address 80.

The user enters into subject 60 the topic of mail message 70 during composition of mail message. The user, during the reading of mail message 70, can determine the topic of the mail message identified by third party 18 or other user by reviewing subject 60.

The user may optionally attach a file to mail message 70 during the composition of mail message 70 by use of attachment 82. The user may review files on received mail messages 70 including documents or digital pictures that have been attached by use of attachment 82.

Figure 11:
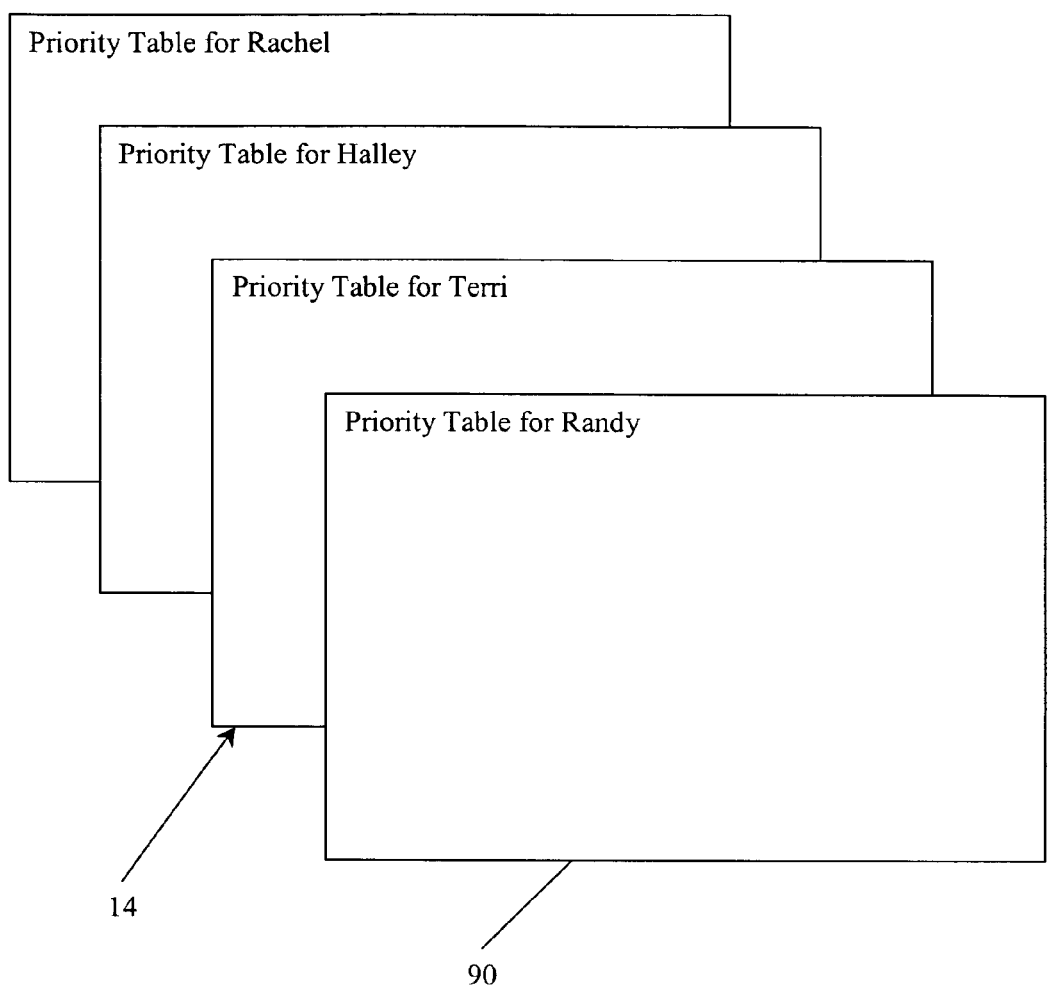
FIG. 11 is a block diagram of the priority database of the present invention.

Referring to FIG. 11, the preferred embodiment of a prioritizing system object that provides a means for distinguishing and relating mail messages according to selection criteria is a priority database 14 that is shown to comprise multiple priority tables 90. Priority database 14 enables the users of message prioritization system 2 to individually monitor incoming and outgoing mail messages 70 through selection criteria so as to determine what action the user may wish to take based on the sending and receiving of mail messages 70. Each user preferably has their own priority table 90 in priority database 14 for a particular user account defining the characteristics of mail messages 70 that it parses and the timing associated therewith. The preferred operation of priority database 14 is described in greater detail below.

Figure 12:
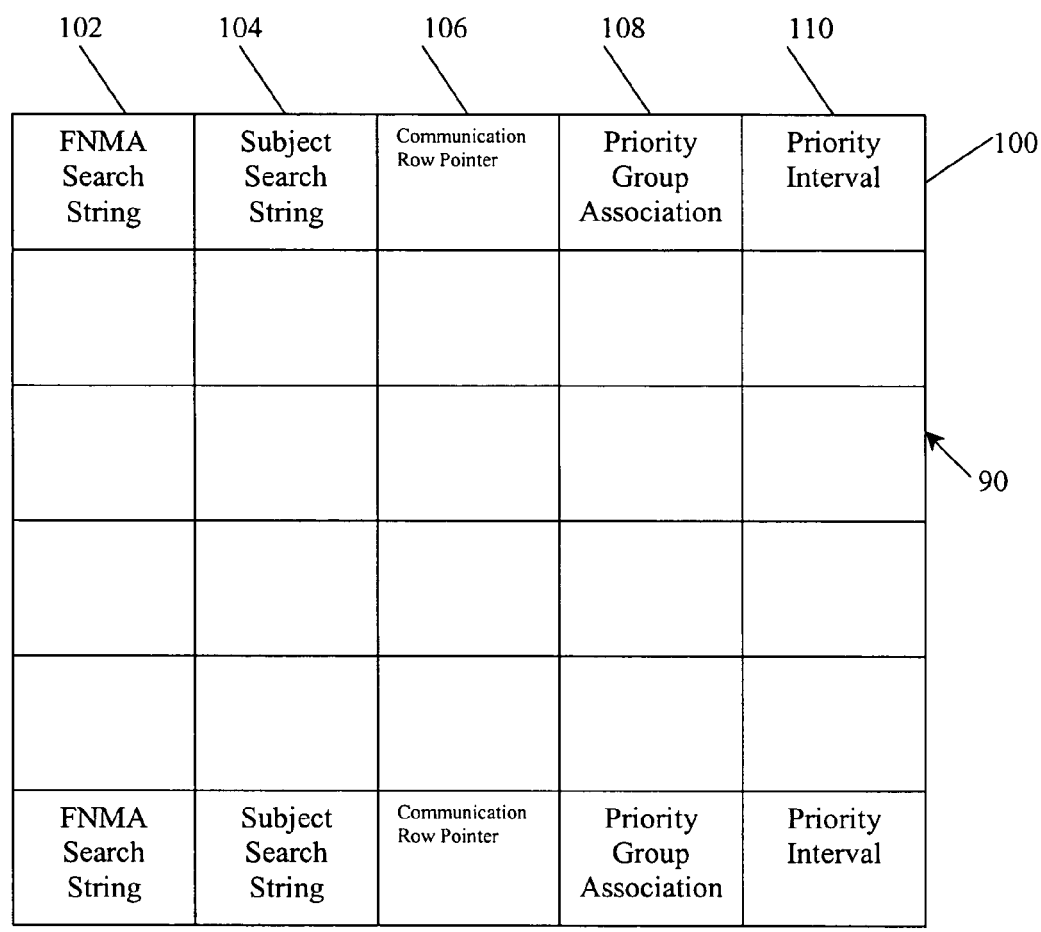
FIG. 12 is a block diagram of the priority table of the present invention.

Referring to FIG. 12, the preferred embodiment of priority table 90 is shown to comprise one or more priority table rows 100, with each priority table row 100 performing a separate parsing operation. Thus, each priority table 90 of message prioritization system 2 preferably has a number of priority rows 100 relative to the number of differing message information portion 71 that a particular user is parsing (e.g., mail from addresses 500 and/or subjects 60 as used in the preferred embodiment) pursuant to the present invention. Each priority table row 100 preferably has a FNMA search string 102, subject search string 104, communication table pointer 106, priority group association 108 and priority interval 110 as described in greater detail below.

From name and mail address (FNMA) search string 102 searches for a string of characters in the from name and mail address 78 of mail message 70. Thus, depending on the string of characters used, it is possible to identify not only a specific recipient by mail address or name, but also a group of people by domain name extension or company name. By default, FNMA search string 102 will contain an exact mail address of third party 18 or other user 19. However, it should also be appreciated that FNMA search string 102 may be null so that a search by only subject string 104 may alternatively be used.

Subject search string 104 recognizes subject 60 of mail messages 70 by preferably ignoring any response (e.g., "RE:") or forwarding (e.g., "FWD:") information added to the original subject line and matching a number of character strings in subject 60. Preferably, if subject string 104 matches 40 characters (excluding the ignored information) in subject 60, then subject search string 104 matches subject 60. However, a greater number or lesser number of characters may be used as desired in a particular implementation of the present invention.

It should be appreciated that an embodiment of the present invention may not search for subject search string 104 and use only FNMA search string 102 to track mail messages 70. Thus, user would only track mail messages 70 by third party 18 and other user 19, regardless of the subject of mail message 70.

It should also be appreciated that in an alternate embodiment of the present invention other information such as routing information 72 and/or to name and mail address 80 may be used additionally or alternatively as message information portion 71 that is parsed by use of a priority table. However, it is an essential part of the present invention that specific information not be included in message information portion 71 to allow for parsing of mail messages 70, otherwise third party 18 or other user 19 could become aware of the user's use and prioritization of the present invention which may be undesirable to the user of the present invention.

Communication row pointer 106 provides a means to track mail messages 70 for a particular priority table row 100 by linking a particular priority table row 100 with a communication table row 130 (FIG. 14) as described in greater detail below. Thus, in the preferred embodiment of the present invention, priority table row 100 acts as the monitor of incoming and outgoing mail messages 70, while communication table row 130 acts as the tracker of incoming and outgoing mail messages 70.

Priority interval 110 determines the period of time that message prioritization system 2 will wait from the time and date a mail message 70 was sent or received before it escalates a notification level of to the user. In the preferred embodiment, priority group association 108 is used to group together a number of priority table rows 100 so that each of them have identical priority intervals 110. The use of priority interval 110 and priority group association 108 are described in greater detail below.

Figure 13:
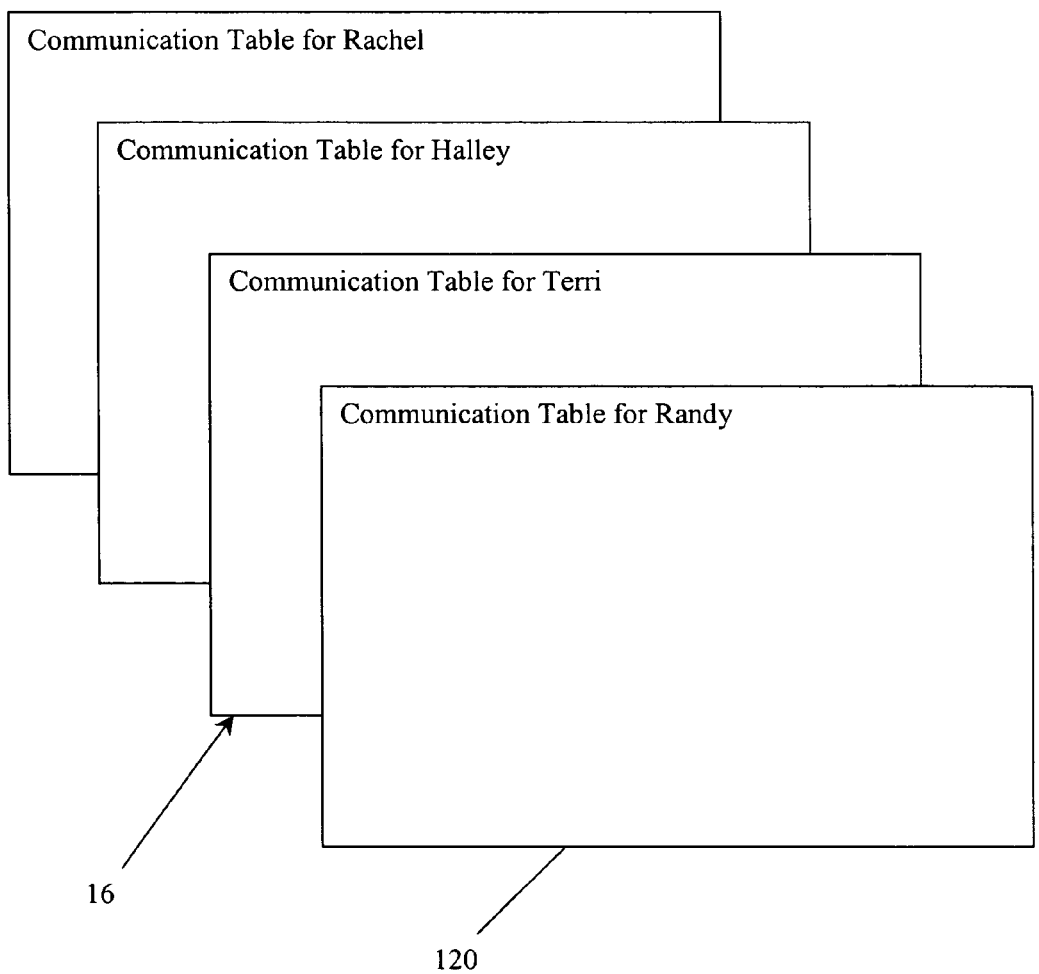
FIG. 13 is a block diagram of the communication database of the present invention.

Referring to FIG. 13, the preferred embodiment for a tracking system object that provides a means to track mail messages 70 comprises communication database 16 with multiple communication tables 120. Preferably, each user has their own communication table 120 that tracks the sending and receiving of mail messages 70 according to the user's priority table 90. The preferred operation of communication tables 120 is described in greater detail below.

Referring to FIG. 14, the preferred embodiment of communication table 120 is shown to comprise one or more communication table rows 130, with each communication table row 130 performing a separate tracking operation. Thus, each communication table 120 of message prioritization system 2 preferably has a number of communication table rows 130 relative to the number of differing message information portions 71 and third party users 18 or other users 19 that a particular user is tracking. Each communication table row 130 preferably has a row pointer 132, subject of last user message 134, date of last user message 136, subject of last third party message 138, date of last third party message 140, identity of last third party 142 and message pointer 144 as described in greater detail below.

Row pointer 132 identifies the location of a corresponding priority table row 100 for which it is tracking. In addition, row pointer 132 may also point to the location of another communication table row 130, such as when there are multiple recipients on a particular mail message 70 that it is tracking. However, in such case row pointer 132 ultimately points to communication table row 130 such that the communication table rows 130 act as a circularly linked list.

Communication row 130 tracks the selection criteria for the user (e.g., subject of last user message 134 and date of last user message 136) and of the third party 18 or other user 19 (e.g., subject of last third party message 138 and date of last TP message 140) so that message prioritization system 2 can determine who was the last person (i.e., user or third party 18/other user 19) to send a particular mail message 70 with, in the preferred embodiment, a specific subject 60 that matched the selection criteria and how long ago was the last mail message 70 was sent.

Subject of last user message 134 captures subject 60 of the last mail message 70 sent by third party 18 or other user 19 that met the selection criteria of the linked to priority table row 100. Preferably, a character string of the first forty characters is captured by subject of last user message 134, and all forwarding and replying information is excluded from the captured string. However, it should be appreciated that more or less characters are capable of being captured under the present invention depending on the implementation of the present invention as described in greater detail above.

Date of last user message 136 records date 62 of when the user sent the last mail message 70 to third party 18 or other user 19 that met the criteria of the linked to priority table row 100.

Subject of last third party message 138 captures subject 60 of the last mail message 70 received from a specific third party 18 or other user 19 that met the criteria of the linked to priority table row 100. Preferably, the same number of characters captured with the subject of last user message 134 is captured, and all forwarding and replying information is also excluded from the captured string.

Date of last TP message 140 records date 62 of when third party 18 or other user 19 sent the last mail message 70 to the user that met the criteria of the linked to priority table row 100.

Message pointer 144 points to mail message 70 associated with inbox 20 that was tracked. If mail message 70 is deleted or not retained (such as user's mail messages 70 sent to third party 18 or other user 19), message pointer 144 points to a location that contains a temporary stored copy of mail message 70 until message pointer 144 of communication table row 130 is again updated.

Figure 15:
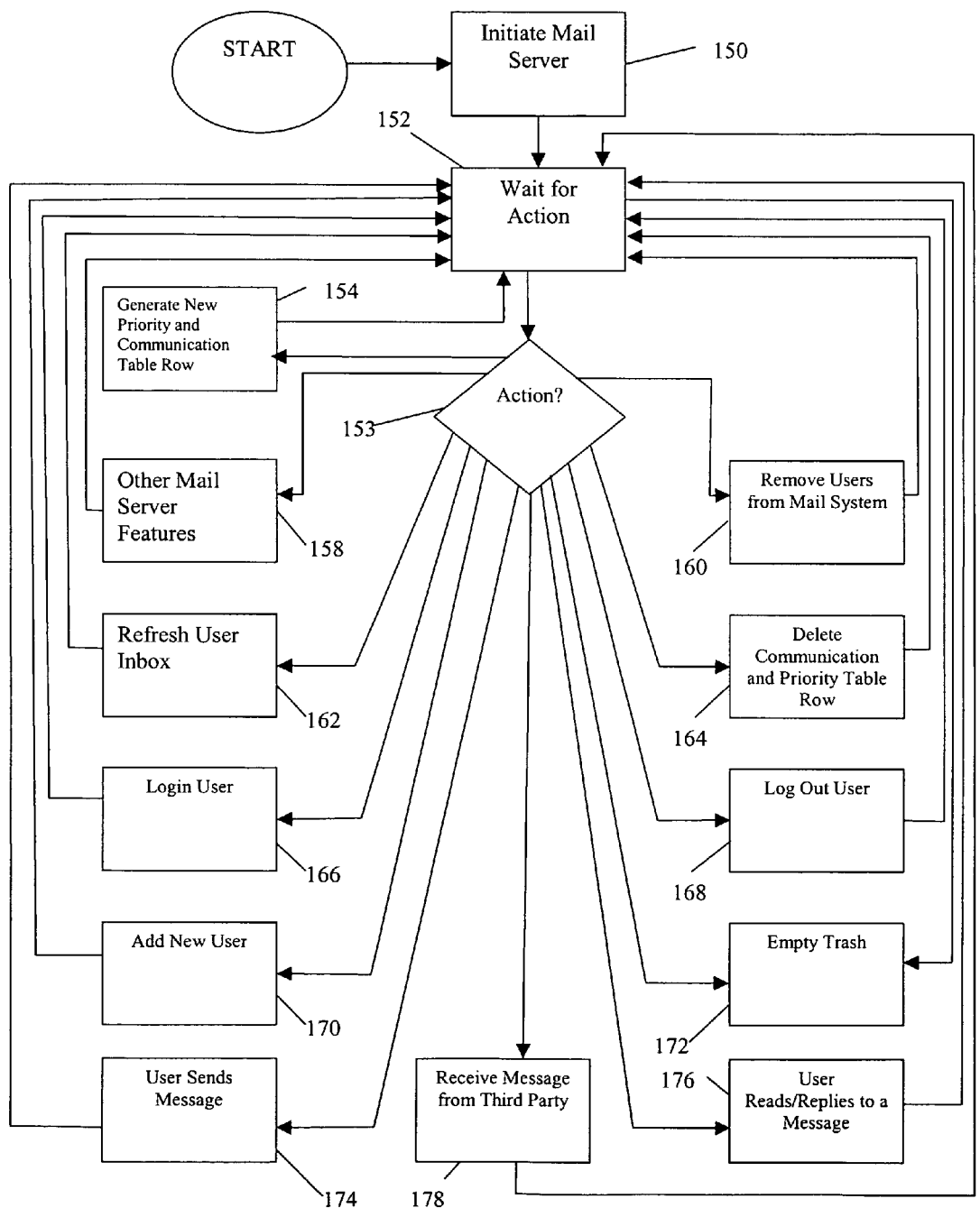
FIG. 15 is a flowchart of the operation of the mail server of the present invention.

Referring to FIG. 15, an exemplary method of operating mail server 10 is initiated at step 150. Preferably, mail server 10 is launched by a system administrator by double clicking on an icon on his computer desktop or by auto-launching upon booting of computer server 4. The system administrator preferably controls and monitors the operation of mail server 10, by booting and rebooting mail server as needed, installing software upgrades and monitoring the performance of mail server 10.

As mail server 10 is preferably a server in a client/server relationship, at step 152 it waits for communication so that it can process requests. Once mail server 10 receives a request at step 152, mail server 10 at decision point 153 proceeds to determine what action it has been requested to perform. Once it has completed the requested action, mail server 10 returns to the waiting state at step 152.

At decision point 153, mail server 10 may take a number of different actions based on the requests that it receives prior to returning to step 152. Mail server 10 may process a login request received from mail client 12 at step 166. The user login process is described in greater detail below.

Alternatively from decision point 153, mail server 10 may proceed to step 154 where mail server 10 generates a new priority table row 100 and communication table row 130. The preferred method for such generation is described in greater detail below. Mail server 10 as a further alternative at decision point 153 may proceed to present or refresh inbox 20 to a user at step 162. The preferred method of displaying inbox 20 to the user is described in greater detail below. Mail server 10 may also add additional users to mail server 10 at step 170 from decision point 153. The preferred method of adding new users to mail prioritization system 2 is described in greater detail below.

At step 174, mail server 10 from decision point 153 may process a user request to transmit mail messages 70 to third parties 18 and/or other users 19 through mail prioritization system 2. The preferred method of transmitting mail messages 70 is described in greater detail below.

From decision point 153, mail server 10 may selectively delete priority table row 100 and communication table row 130 from priority table 90 and communication table 120 at step 164.

When user directs mail prioritization system 2 to purge all of mail messages 70 associated with trash link 32, mail server 10 at decision point 153 proceeds to step 172 to purge deleted mail messages 70.

When mail server 10 receives a mail message 70 from third party 18 or other user 19 at decision point 153, mail server 10 proceeds to step 178 where it processes mail message 70 and communicates with mail client 10. The preferred method of receiving mail messages 70 is described in greater detail below.

When user replies to a previously received mail message 70, mail server 10 at decision point 153 proceeds to step 176 to provide the user with the capability of responding to mail message 70. The preferred method of the user replying to mail messages 70 is described in greater detail below.

From decision point 153, mail server 10 may proceed to step 168 to terminate a user's session with mail server 10. The preferred method of logging the user off of mail prioritization system 2 is described in greater detail below.

Mail server 10, from decision point 153, may at step 158 perform other functions of mail server 10 unrelated to the present invention.

Finally, when the users decide they want to permanently cease using mail server 10, at decision point 153 mail server 10 proceeds to step 160 to remove the users from mail prioritization system 2. Other operations of mail server 10 will be appreciated by those with skill in the art of mail messaging systems.

Figure 16:
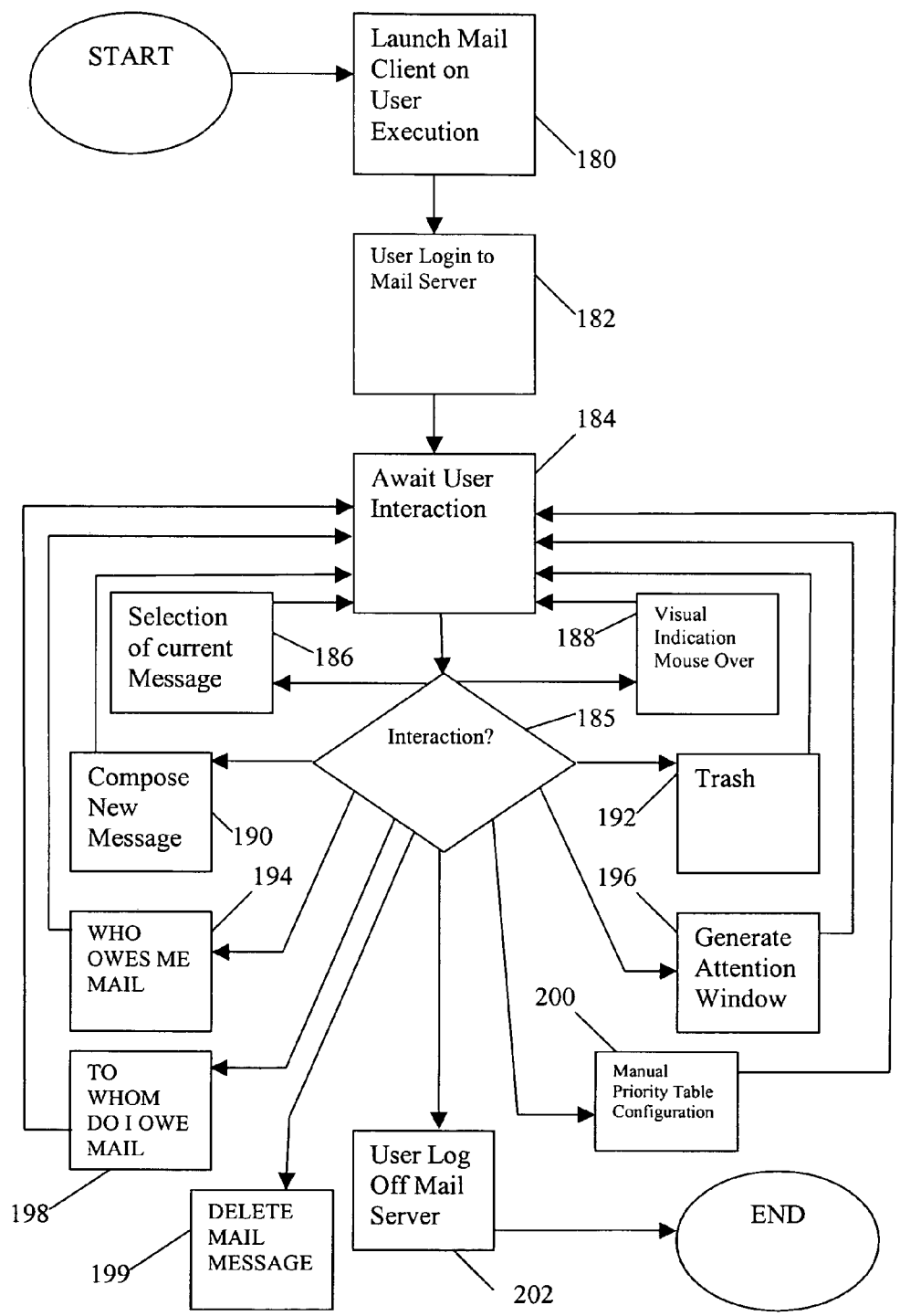
FIG. 16 is a flowchart of the operation of the mail client of the present invention.

Referring to FIG. 16, the preferred operation of mail client 12 is initiated at step 180 when a user first launches client application 21 of mail client 12. Preferably, the user double clicks on an icon on their desktop of user computer 6 to launch client application 21. The user is then preferably presented with a splash screen on their display of user computer 6 while client application 21 triggers the initiation of mail client 12.

It should be appreciated with respect to the foregoing step 180 that when mail client 12 is web based, the user first launches a web browser and then selects ands enter the proper uniform resource locator (URL) for mail client 12 into the web browser. Mail client 12 then presents the user with a window requesting user to login to mail server 10.

Mail client 12 then at step 182 presents the user with a login window. After user provides login information to mail client 12, mail client 12 and mail server 10 processes and authenticates the login information as described in greater detail below.

Once the user is logged into mail client 12 after the completion of step 182, mail client 12 at step 184 awaits interaction from the user before proceeding to decision point 185. Thereafter, mail client 12 proceeds to one of several steps depending on the user's interaction with mail client 12 before returning to a waiting state at step 184.

If the user selects a subject 60 of a mail message 70 at decision point 185, then mail client 12 proceeds to launch read message window 24 at step 186 as described in greater detail below. The user may then read and/or reply to mail message 70 as described in greater detail below, or proceed to read the previous mail message 70 or next mail message 70 available in inbox 20. Upon completion of step 186, mail client 12 returns to step 184.

When the user selects new message link 34 on inbox 20, mail client 12 at step 185 proceeds to step 190 to provide the user with an opportunity to compose a new mail message 70. The preferred method of the user composing and sending a new mail message 70 is described in greater detail below. Upon completion of step 185, mail client 12 returns to step 184.

When the user clicks on who owes me mail link 38 on inbox 20, mail client 12 at step 185 proceeds to step 194 to determine which third parties 18 and other users 19 own the user mail messages 70. The preferred method of mail prioritization system 2 generating a list of third parties 18 and other users 19 that owe mail messages 70 to the user is described in greater detail below.

When the user clicks on to whom do I owe mail link 40 on inbox 20, mail client 12 at step 185 proceeds to step 198 to determine to which third parties 18 and other users 19 the user owes mail messages 70. The preferred method of message prioritization system 2 generating a list of third parties 18 and other users 19 to whom the user owes mail messages 70 is described in greater detail below.

When the user seeks to log out of message prioritization system 2, the user selects close inbox link 36 on inbox 20 such that at step 185 mail client 12 proceeds to step 202. The preferred method of logging off of mail prioritization system 2 is described in greater detail below.

If the user seeks to manually configure priority table 90, then the user selects priority table manual config link 42 on inbox 20 such that mail client 12 will proceed from decision point 185 to step 200. The preferred method of the user manually configuring priority table 90 is described in greater detail below.

If user wants to permanently delete a mail message 70, the user indicates such action so that mail client 12 at decision point 185 proceeds to step 199. The preferred method of permanently deleting mail messages 70 is described in greater detail below.

When the user wants to generate and view an attention window, the user clicks generate attention window link 42 in inbox 20 so that mail client 12 proceeds from decision point 185 to step 196. The preferred method of generating an attention window is described in greater detail below.

When user wants to empty the trash mail messages 70, user clicks on trash link 32 in inbox 20. Thereupon, mail client 12 proceeds from decision point 185 to step 192, whereby mail client 12 directs mail server 10 to remove the selected mail messages 70 from inbox 20 of the user.

The user may determine details regarding a visual indicator 56 in inbox 20 by mousing over visual indicator 56. When the user mouses over, mail client 12 proceeds from decision point 185 to step 188 to provide information from the respective communication table row 130 of mail message 70 to the user.

Figure 17:
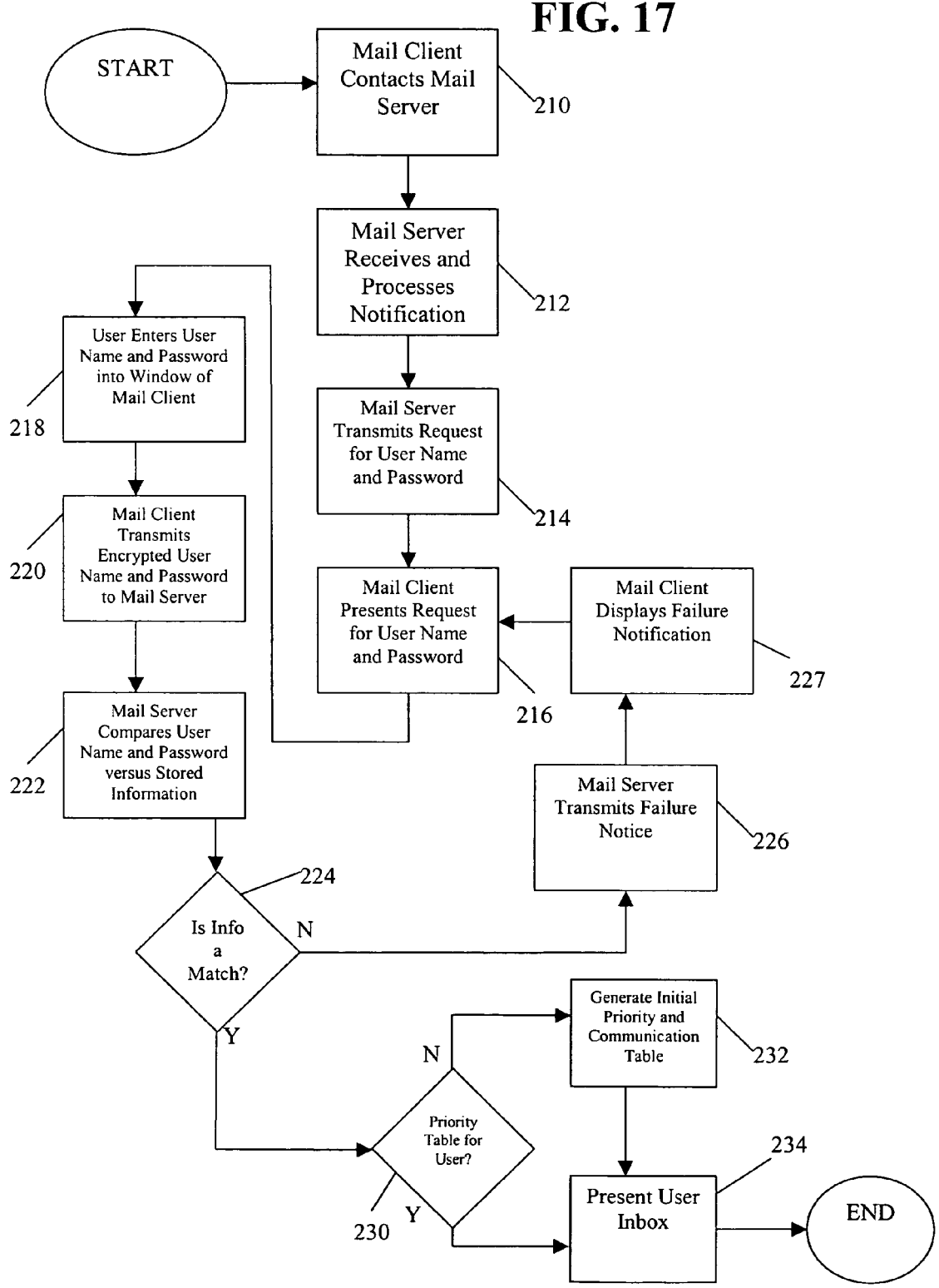
FIG. 17 is a flowchart of the method of the user logging into the mail server of the present invention.

Referring to FIG. 17, the preferred method by which the user logs into mail server 10 begins after the user first launches mail client 12 at step 180 as described above. Mail client 12 then at step 210 by use of client application 21 contacts mail server 10 through communication network 8 to notify it that a particular user wants to access that user's inbox 20 on message prioritization system 2.

Mail server 10 at step 212 receives and processes the notification sent by mail client 12 in step 210. If mail server 10 verifies that mail client 12 is a proper client of message prioritization system 2, mail server at step 214 transmits a request to mail client 12 for the user name and password.

Mail client 12 at step 216 receives the request from mail server 10 and presents the request to the user. Thus, the user is instructed through a newly launched window on the display of user computer 6 to enter in the user login name and password into appropriately labeled boxes on the newly launched window.

User at step 218 enters in user login name and password into the appropriately labeled boxes for message prioritization system 2. Thereafter, at step 220 mail client 12 encrypts and transmits over communication network 8 the user login name and password to mail server 10.

It should be appreciated that mail client 12 may optionally retain authorization information on user computer 6 in the form of a cookie or other mechanism, and thereby selectively modify steps 210-226 such that mail client 12 transmits the authorization information to mail server 10 and mail server 10 provides inbox 20 information to the user as described at step 228 below.

Mail server 10 at step 222 receives the user login name and password from mail client 12 and compares it against previously stored information on computer server 4. Thereafter, at decision point 224, mail server 10 determines whether the received user login name and password match the stored user name and password. If no, mail server 10 at step 226 transmits a login failure notification to mail client 12. Mail client 12 receives the login failure notification and then presents it to the user at step 227 along with another request for the login name and password at step 226.

It should be appreciated that mail server 10 and mail client 12 can operate in other ways known in the art of logging in to computer systems when the user fails to provide the proper user login name and password. For example, if the user remembers the user login name but forgets the password, the user may be prompted with questions to reset or obtain the password.

Once the user login name and password match at decision point 224, then at decision point 230 mail server 10 determines whether the user has a priority table 90 associated with their inbox 20. If no, then at step 232 mail server 10 generates an initial priority table 90 and communication table 120 for the user as described in greater detail below. After step 232, or if at decision point 230 there is a priority table 90 associated with the user's inbox 20, then at step 234 inbox 20 is presented to the user as described in greater detail below.

Figure 18:
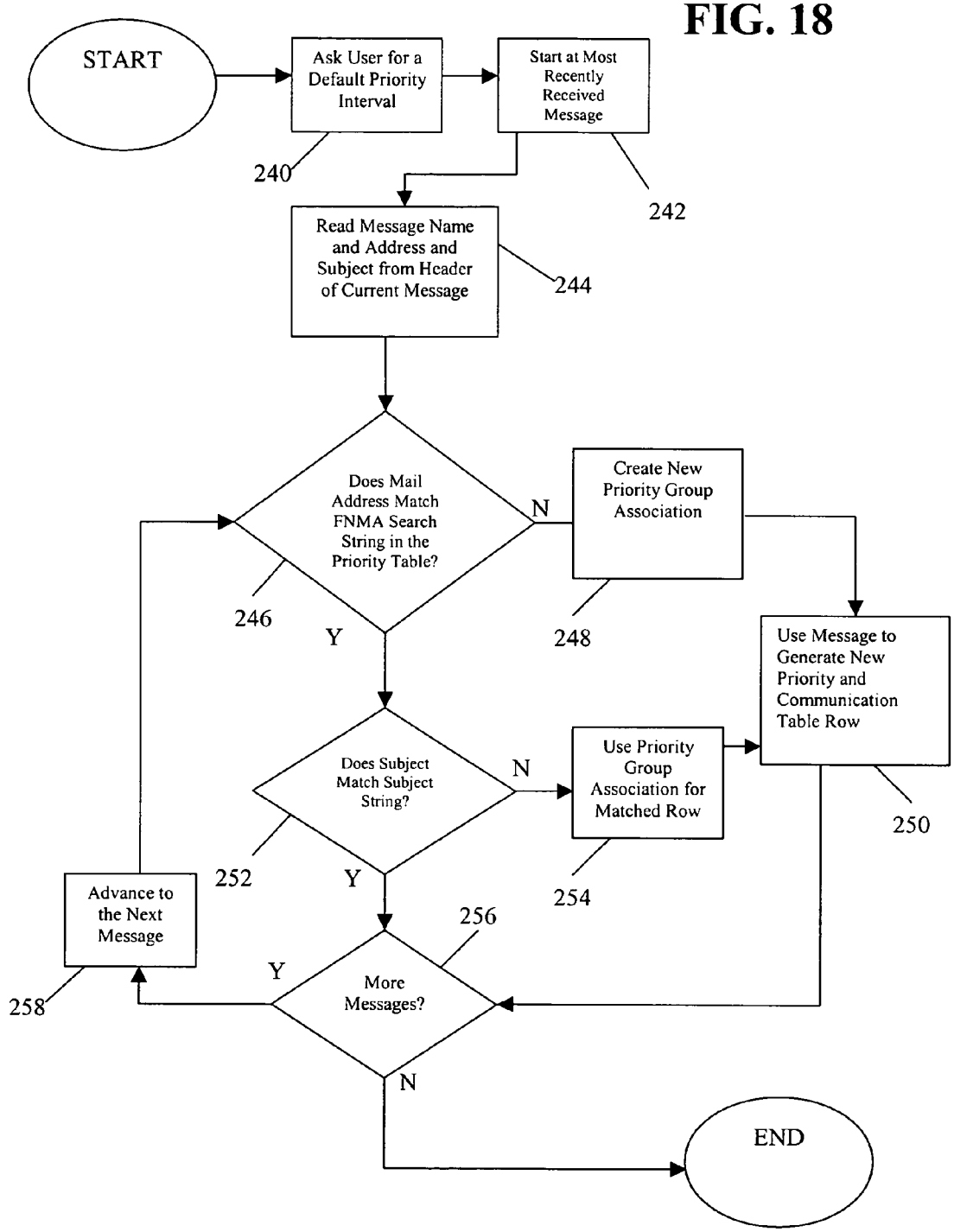
FIG. 18 is a flowchart of the method of generating the initial user priority and communication table of the present invention.

Referring to FIG. 18, the preferred method for generating the initial priority table 90 and communication table 120 is shown to first comprise a step 240 where mail server 10 communicates over communication network 8 with mail client 12 to present a window requesting a default priority interval 110. Priority interval 110 of message prioritization system 2 is the maximum desired length for response time between the user sending or receiving mail message 70 and the current date and time. For example, if priority interval 110 is twenty-four hours, and the user received a mail message 70 thirty hours ago, the user would be one increment beyond priority interval 110 and thus have a priority level of one. If the user received the message sixty hours ago, the user would be three increments beyond priority interval 110 and thus have a priority level of three. Accordingly, users can determine how timely or untimely the user, third parties 18 and/or other users 19 are in responding to a particular mail message 70. In addition, the user may determine whether the user, third parties 18 and/or other users 19 should send a mail message 70 to another party because one party has not heard from the other for beyond a set period of time (i.e., priority interval 110).

Default priority interval 110 is associated with all mail messages 70 in inbox 20 by assigning as a default a default priority group association 108 to all mail messages 70 in inbox 20 as described in greater detail below. In addition, the association between priority interval 110 and priority group 108 is also described in greater detail below.

Once the user records default priority interval 110 at step 240, mail server 10 at step 242 sets a pointer to the most recently received mail message 70 associated with inbox 20 at step 242.

Thereafter and in the preferred embodiment, mail server 12 at step 244 reads from name and mail address 78 and subject 60 from mail message 70. Next, at decision point 246, mail server 12 compares from name and mail address 78 against the FNMA search string 102 to determine whether priority table 90 already has an entry with respect to mail message 70 received from a particular third party 18 or other user 19. However, it should be appreciated that multiple third parties 18 and/or other users 19 may match, or that the FNMA search string 102 may be null to match strictly by subject 60 only.

If there is no match, mail server 12 has determined that third party 18 and/or other user 19 has not previously sent the user a mail message 70 that has been tracked in priority table 90. Thus, mail server 12 at step 248 creates a new priority group association 108 for third party 18 and/or other user 19 so that by default each mail address has its own priority group association.

By default, all priority table rows 100 are associated with the default priority group association 108 and thereby the default priority interval 110. Thus, the amount of time that the user has to respond to mail messages 70, third parties 18 and/or other users 19 have to respond to mail messages 70 from the user is the same, because all have the same priority interval 110 by reason of having the default priority group association 108. However, during manual configuration as described in greater detail below, the user edits and modifies priority group associations 108 and priority intervals 110 associated therewith as will be described in greater detail below. For example, the user may thereby set an identical priority interval 110 for a particular third party 18, a group of third parties 18 located at the same company, or for the same subject 60 by creating a new priority group association 108 for multiple mail messages 70.

Thereafter, at step 250 the user utilizes mail message 70 to generate a new priority table row 100 and communication table row 130 as described in greater detail below.

If at decision point 246 the mail address matches the FNMA search string 102 in a priority table row 100 of priority table 90, mail server 10 proceeds to decision point 252 to determine whether subject 60 matches subject search string 134 or 138. If no, mail server 10 at step 254 uses the priority group association 108 for the matched priority table row 100. Accordingly, by default all matching mail addresses are in the same priority group association 108 thus allowing for changing of the default interval for all matching mail addresses by changing priority interval 110 associated with a particular priority group association 108.

Thereafter, mail server 10 proceeds to step 250 to utilizes mail message 70 to generate a new priority table row 100 and communication table row 130. If at decision point 252 the subject matches the subject 60 search string 104, then mail server 10 proceeds to step 256 to determine if there are more mail messages 70 in inbox 20. If yes, mail server 10 proceeds to step 258 to advance to the next mail message 70 in inbox 20 and thereafter proceeds to step 244. If no, the process for generating the initial user priority table 90 and communication table 120 is complete.

Figure 19:
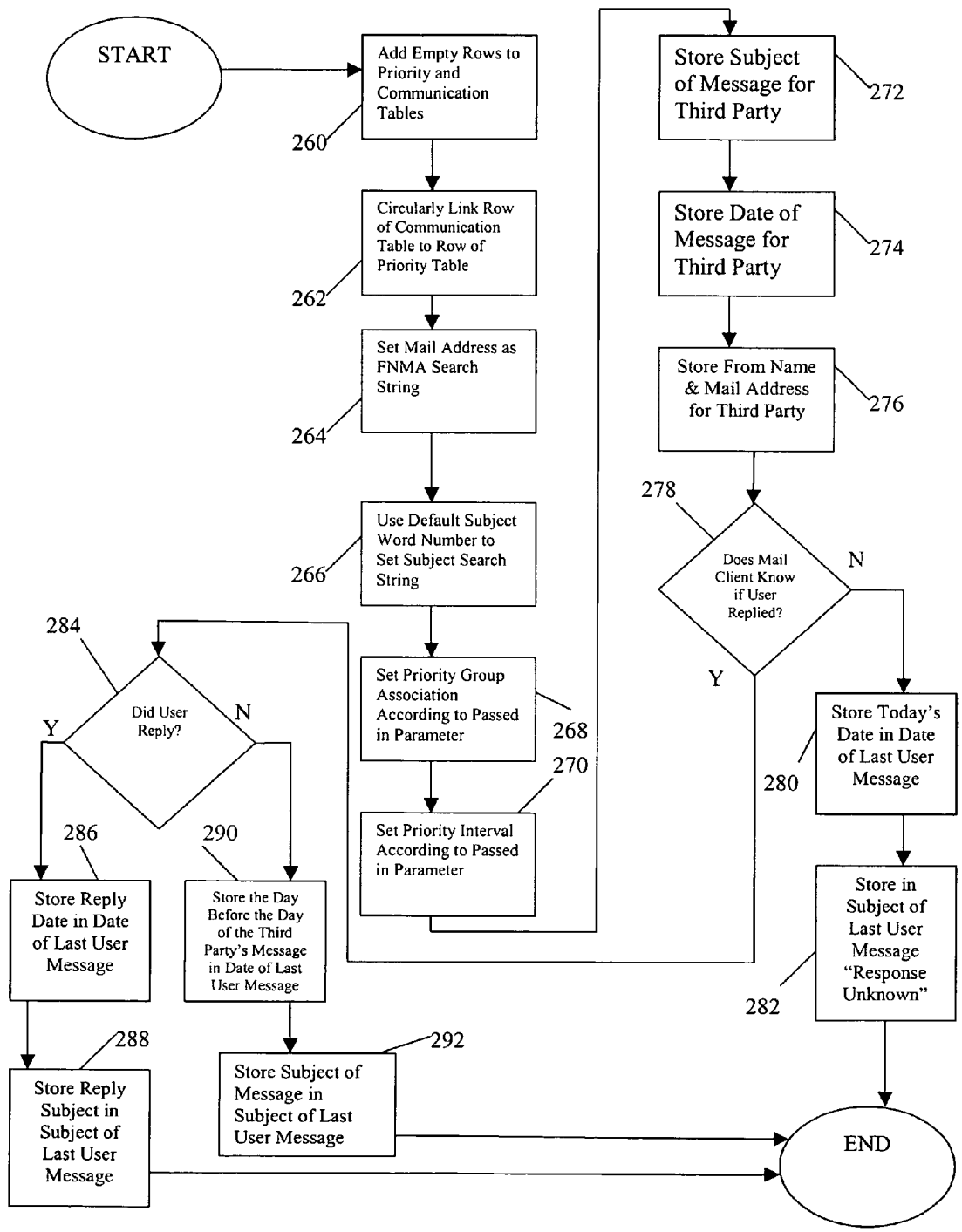
FIG. 19 is a flowchart of the method of generating a new priority and communication table row of the present invention.

Referring to FIG. 19, the preferred method of generating a new priority table row 100 and communication table row 130 is shown to a comprise a first step 260 where empty rows are added respectively to priority table 90 and communication table 120.

Thereafter, mail server 10 at step 262 initializes a pointer from communication pointer 106 of empty priority table row 100 to empty communication table row 130. In addition, a pointer is also initialized from priority table pointer 132 of empty communication table row 130 to priority table row 100. Thus, communication table row 130 and priority table are circularly linked by the aforementioned method.

When there are additional third parties 18 and/or other users 19 beyond a sender and receiver of a mail message 70, such as when multiple people are copied on a mail message 70, a communication table row 130 is preferably generated for each person. However, such mail message 70 only has one priority table row 100 associated with it. Thus, priority table pointer 132 of communication table row 130 may point to an additional communication table row 130, with the final communication table row 130 in the chain pointing back to priority table row 100.

After step 262, mail server 10 at step 264 uses the mail address portion of from name and mail address 78 of mail message 70 as the FNMA search string 102 of priority table row 100. Accordingly, FNMA search string 102 by default is set to utilize the mail address portion instead of the entire from name and mail address 78. However, it should be appreciated that the default recognition may be adjusted in desired implementations of the present invention and that the user may manually change such information to suit the user's monitoring and tracking needs.

Mail server 10 at step 266 completes subject search string 104 of priority table row 100 so that subject search string 104 will identify subject 60 of mail message 70. More specifically, mail server 10 ignores preliminary nonuser related material in subject 60 (e.g., FWD:, RE:, etc.) and reads a search string for a number of characters such as 40 characters. However, more or less characters may be used depending on the implementation of the present invention.

Mail server 10 at step 268 sets priority group association 108 of priority table row 100 according to the parameter passed into this process. Accordingly, mail server 10 automatically sets priority interval 110 of priority table row 100 by the priority intervals 110 association with the selected priority group association 108.

Mail server 10 at step 272 stores subject 60 of mail message 70 in subject of last user message 134 of communication table row 130. Thereafter, mail server 10 at step 274 stores date 62 of mail message 70 in date of last TP message 140. At step 276, mail server 10 stores from name and mail address 78 of mail message 70 in identity of third party 142 of communication table row 130.

At decision point 278 mail server 10 determines whether the user has responded to mail message 70 received from third party 18 or other user 19. Response information may be used in implementations of message prioritization system 2 where such information is retained from prior use of mail server 10 without the benefit of the present invention. If no, then mail server 10 proceeds to step 280 where today's date and the current time is stored in date of last user message 136. Mail server 10 thereafter stores a null character set in subject of last user message 134 at step 282. Alternatively, at step 282 mail server 10 may store a character string such as "response subject unknown".

If at decision point 278 mail server 10 can determine whether or not user has responded, then mail server 10 proceeds to decision point 284 to take action based on whether the user has actually responded to mail message 70.

If mail server 10 knows that the user has not responded to mail message 70 received from third party 18 or other user 19, mail server 10 proceeds to step 290 and stores the day before the day of transmission of mail message 70 from third party 18 or other user 19 in date of last user message 136. By such storage, the user will be shown in message prioritization system 2 to have not responded to mail message 70 by third party 18 or other user 19. Thereafter, mail server 10 at step 292 stores subject 60 of mail message 70 in subject of last user message 134 thereby ending this process.

However, if mail server 10 has determined that the user has responded to mail message 70 received from third party 18 or other user 19, mail server 10 proceeds to step 286 to store date 62 of user's response to mail message 70 in date of last user message 136. Thereafter, mail server 10 at step 288 stores known subject 60 in subject of last user message 134 thereby ending this process.

Figure 20:
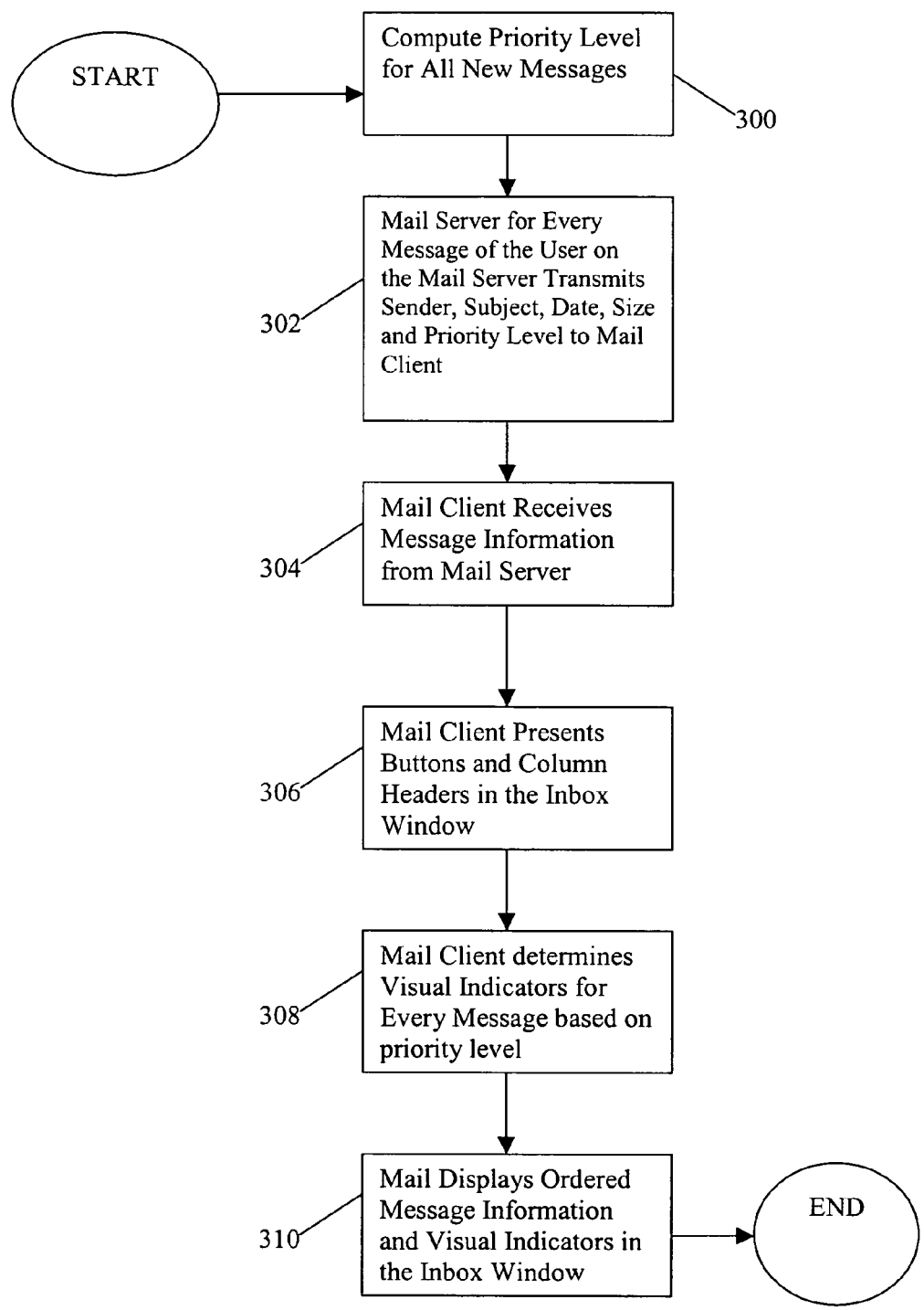
FIG. 20 is a flowchart of the method of presenting the inbox of the present invention.

Referring to FIG. 20, the preferred method of message prioritization system 2 presenting inbox 20 to the user is first by a step 300 where the priority level is computed for all mail messages 70 to be associated with user's inbox 20 as described in greater detail below. The priority level is preferably an integer which identifies for message prioritization system 2 how many priority intervals 110 has it been since the last time a particular mail message 70 has been sent by the user or received from third party 18 and/or other users 19 that matches the selection criteria (e.g., as contained in a specific priority table row 100). The priority level is preferably recalculated every time the user is presented or represented inbox 20 because the current date and time regularly change, and such information is used when calculating the priority level.

At step 302, mail server 10, for every mail message 70 stored on behalf of user on computer server 4, preferably transmits to mail client 12 sender 56, subject 60, date 62, size 54 and the priority level to mail client 12. Upon the completion of step 302, mail client 12 at step 304 receives the aforementioned information transmitted from mail server 10.

Mail client 12 at step 306 then presents links 30, 32, 34, 36, 38, 40, 42 and column headers 46, 48, 50, 52 and 54 of inbox 20 as shown in FIG. 3. However, it should be appreciated that other arrangements of the elements are also meant to fall within the scope of the present invention.

Thereafter, mail client 12 at step 308 determines the visual indicators 56 for every mail message 12 based on priority level as described in greater detail above. Thereafter, mail client 12 displays mail messages 12 and visual indicators 56 ordered in inbox 20 at step 310.

Figure 21:
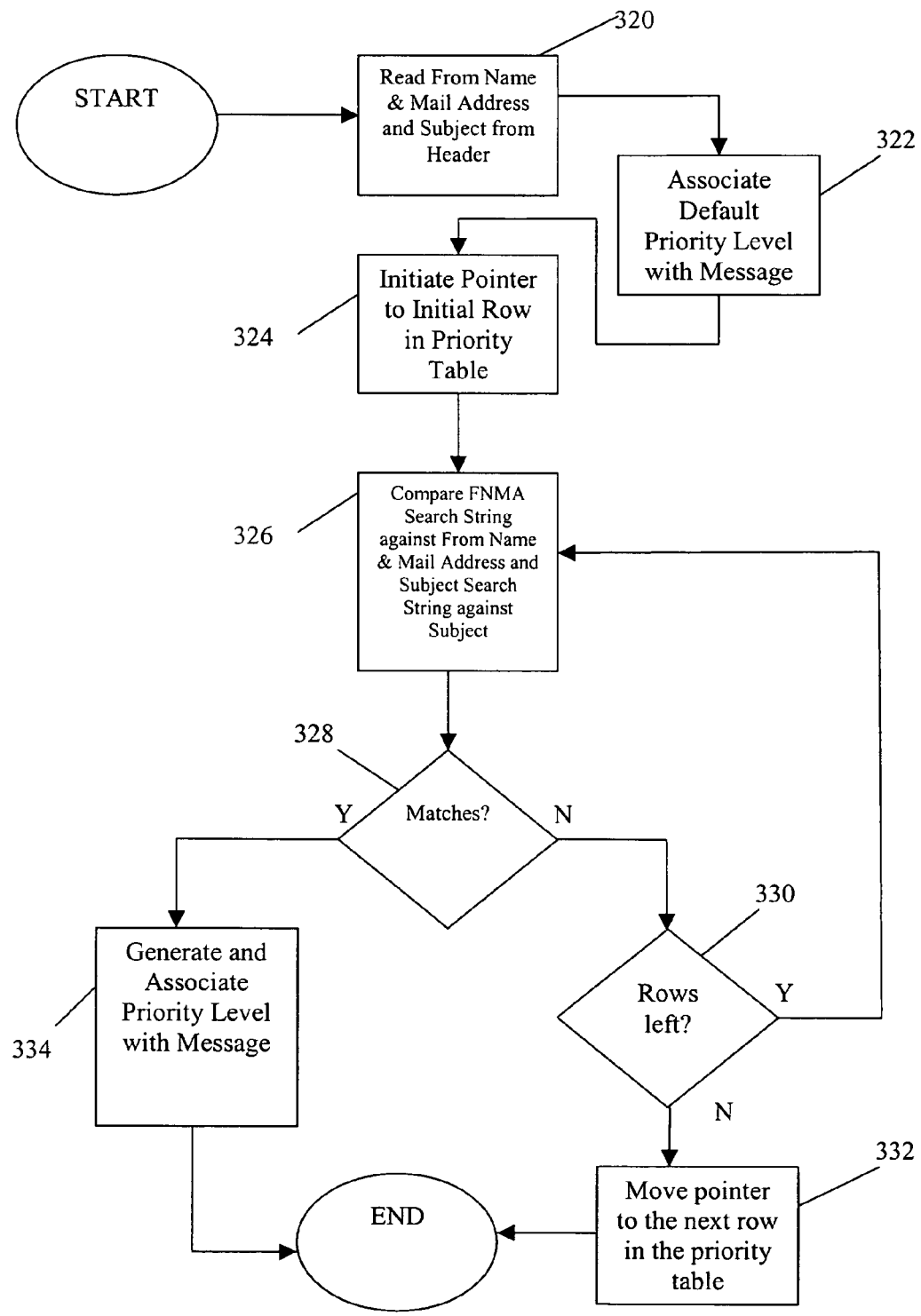
FIG. 21 is a flowchart of the method of computing the priority level of a message of the present invention.

Referring to FIG. 21, the preferred method for computing priority level for mail message 70 first comprises a step 320 where mail server 10 reads from name mail address 78 and subject 60 from header 72 of mail message 70. Thereafter, mail server 10 at step 322 associates a default priority level with mail message 70. The default priority level will be the priority level associated with mail message 70 when priority table 90 has no tracking information stored with respect to a particular mail message 70. Preferably, such default information indicates that the user has an undetermined priority level with the mail message 70. However, it should be appreciated that by default message prioritization system 2 may alternatively associate the lowest, highest, or other priority level as a default for mail messages 70 with an undetermined priority level.

Mail server 10 at step 324 initiates a pointer to the first priority table row 100 in priority table 90, as mail server 10 needs to determine if a priority table row 100 matches the current mail message 70 to indicated that mail message 70 is being monitored by priority table 90. Accordingly, to determine if there is a match with priority table row 100, at step 326 mail server 10 preferably compares FNMA search string 102 against from name and mail address 78 and subject search string 104 against subject 60 (i.e., based on the preferred embodiment of the selection criteria).

Mail server 10 at decision point 328 determines if the comparison at step 326 is a match. If yes, then mail server 10 proceeds to step 334 to generate and associate priority level with mail message 70. The preferred method for generating and associating priority level with mail message 70 is described in greater detail below. If no, then mail server 10 at decision point 328 proceeds to decision point 330 to determine whether there are any priority table rows 100 left in priority table 90. If there are priority table rows 100 remaining, mail server 10 proceeds to step 332 to move the pointer to the next priority table row 100. If there are no priority table rows 100 left in priority table 90 at decision point 330, the process is complete and mail message 70 retains the default priority level with mail message 70.

Figure 22:
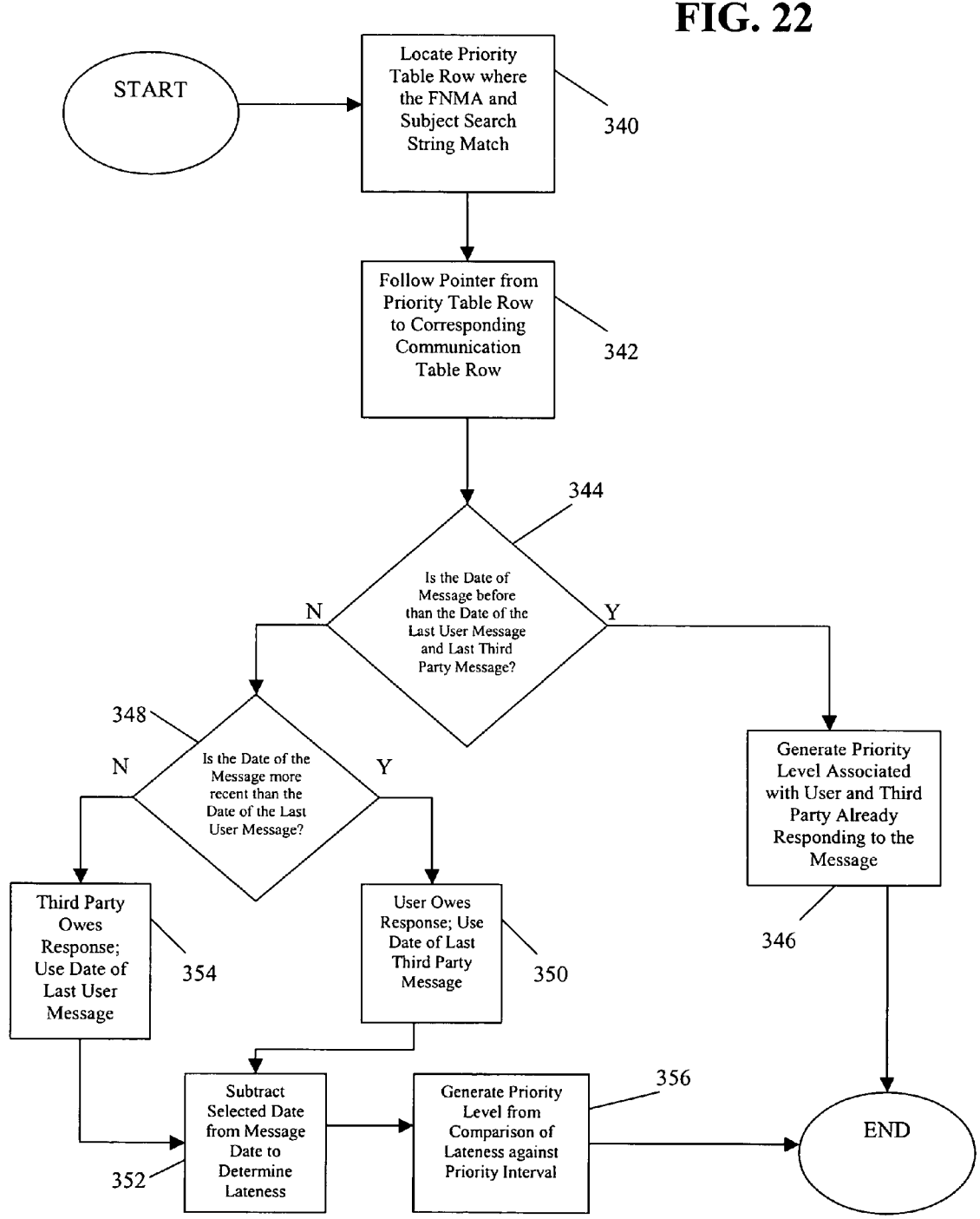
FIG. 22 is a flowchart of the method of generating and associating the priority level with a message of the present invention.

Referring to FIG. 22, the preferred method for generating and associating priority level with mail message 70 is shown to first comprise step 340 where mail server 10 locates the specific priority table row 100 where FNMA search string 102 and subject search string 104 (i.e., the selection criteria in the preferred embodiment) match the particular mail message 70. Thereafter, mail server 10 at step 342 follows communication row pointer 106 from priority table row 100 to the corresponding communication table row 130, as communication table row 130 contains all of the tracking information for the associated mail message 70.

Mail server 10 at decision point 344 determines if date 62 of mail message 70 is older than both the date of the last user message 136 and date of last TP message 138 of the associated communication table row 130. If yes, mail server 10 to proceeds to step 346 where mail server 10 generates a priority level associated with the user and third party 18 and/or other user 19 both already sending and receiving a mail message 70 beyond the current mail message.

If no, mail server 10 to decision point 348 to determine if the date 62 of mail message 70 is more recent than the date of the last user message 136. If yes, then mail server 10 at step 354 determines that third party 18 or other user 19 owes the user a mail message 70. Accordingly, mail server 10 uses the date of the last user message 136 as the selected date. If no, mail server 10 determines that the user owes a response to third party 18 or other user 19 and proceeds to step 350 whereby the date of the last TP message 140 is used as the selected date.

Mail server 10 at step 352 determines the amount of time between date 62 of mail message 70 and the selected to calculate the lateness. Upon completion of step 352, mail server 10 at step 356 generates the priority level from dividing the lateness by priority interval 110 and rounding down to the nearest integer to create the priority level. Accordingly, the priority level identifies how may priority intervals 110 it has been since the user sent a matching mail message 70 to the third party 18 or other user 19 or the third party 18 or other user 19 sent a matching mail message 70 to the user.

Figure 23:
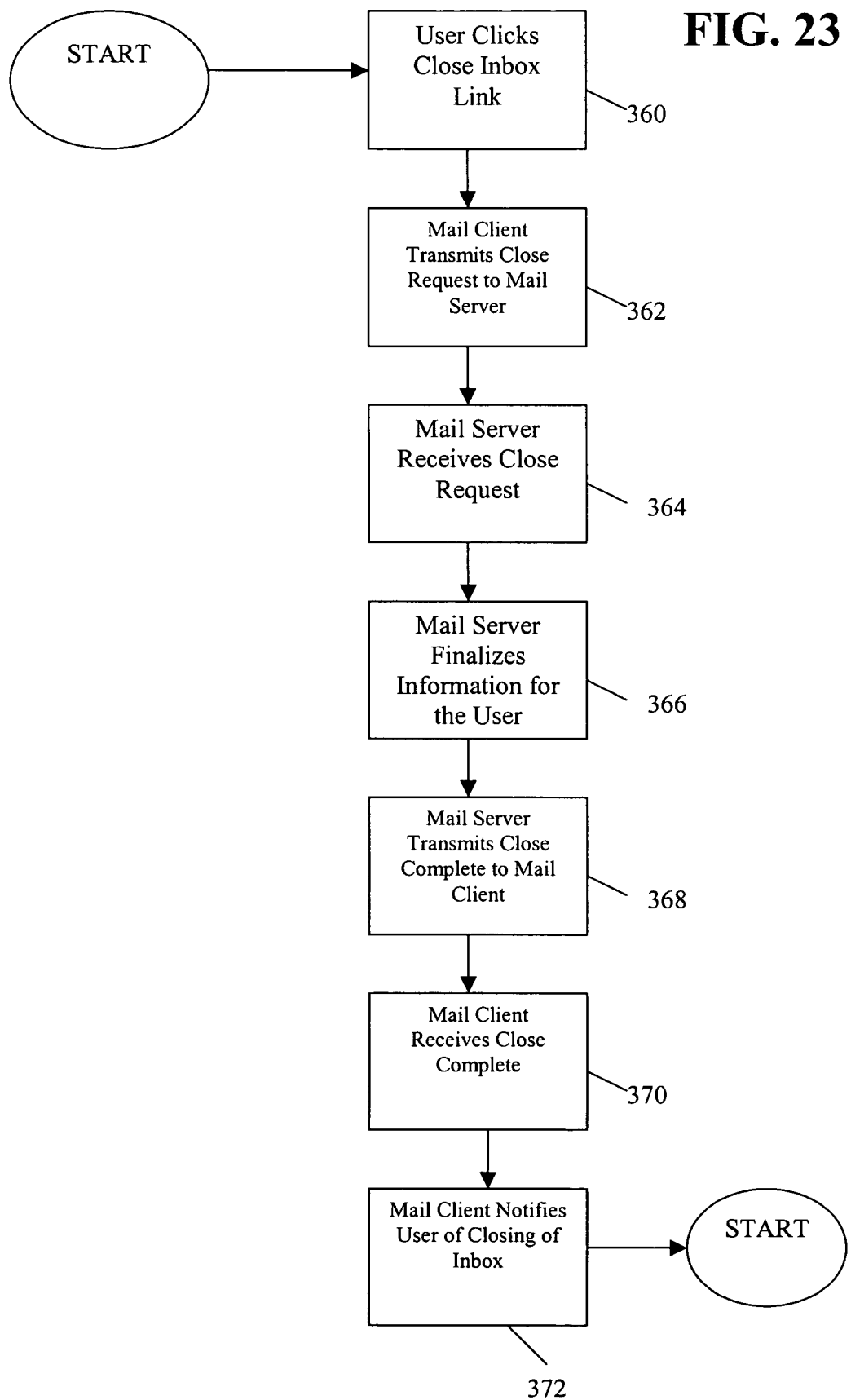
FIG. 23 is a flowchart of the method of the user logging off of the mail server of the present invention.

Referring to FIG. 23, the preferred method of the user logging off of mail server 10 is comprised of a first step 360 whereby the user clicks on logoff link 36. Thereafter, mail client 12 at step 362 transmits a close request to mail server 10. Mail server 10 then receives the close request from mail client 12 at step 364.

Mail server 10 at step 366 finalizes any information for the user, such as by storing anything that is memory on the disk drive. Mail server 10 then transmits close complete notification to mail client 12 at step 368. Thereafter, mail client 12 at step 370 receives the close complete notification. Upon completion, mail client 12 at step 372 notifies the user of the closing of inbox 20 by the termination of client application 21.

Figure 24:
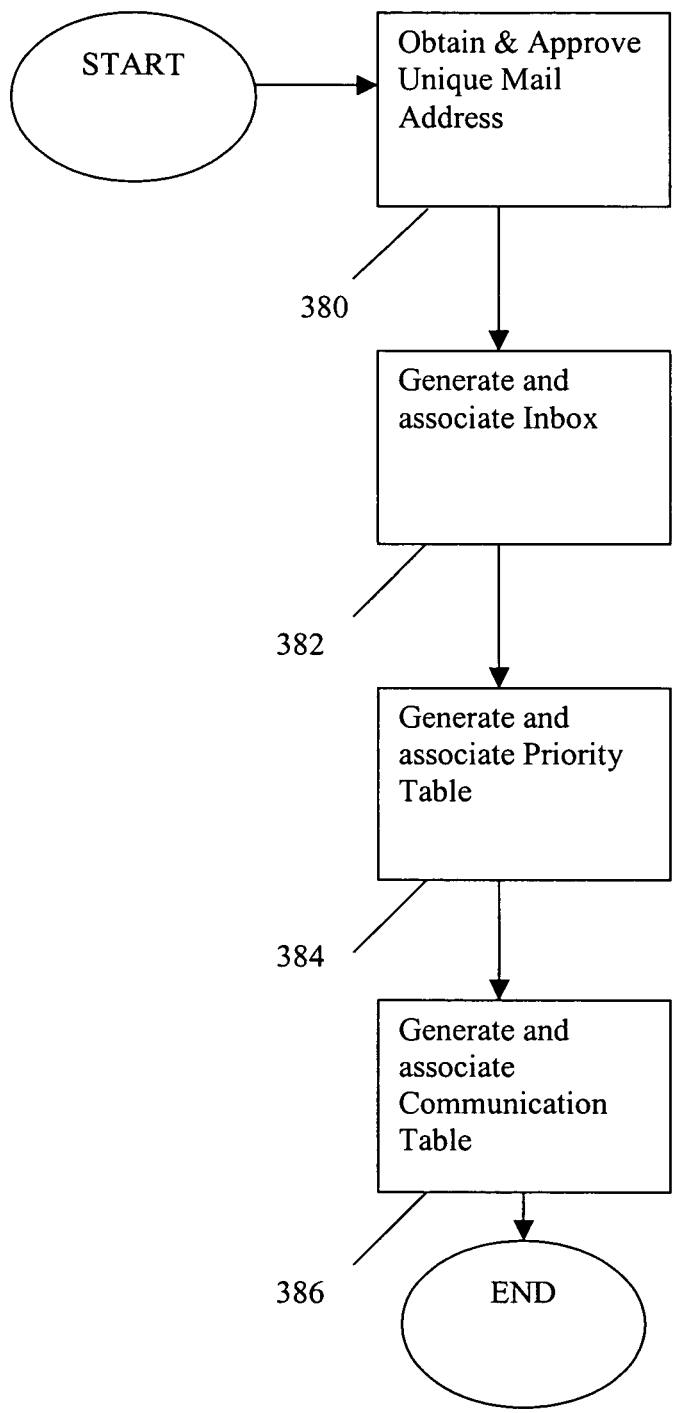
FIG. 24 is a flowchart of the method of adding a new user to the mail server of the present invention.

Referring to FIG. 24, the preferred method of mail server 10 adding a new user comprises a first step 380 whereby mail server 10 obtains and approves of a unique mail address from the user through mail client 12. Upon such approval, mail server 10 at step 382 generates and associates an inbox 20 with the user. Upon completion, mail server 10 then generates and associates priority table 90 with the user at step 384. Finally, mail server 10 proceeds to step 386 to generate and associate communication table 120.

Figure 25:
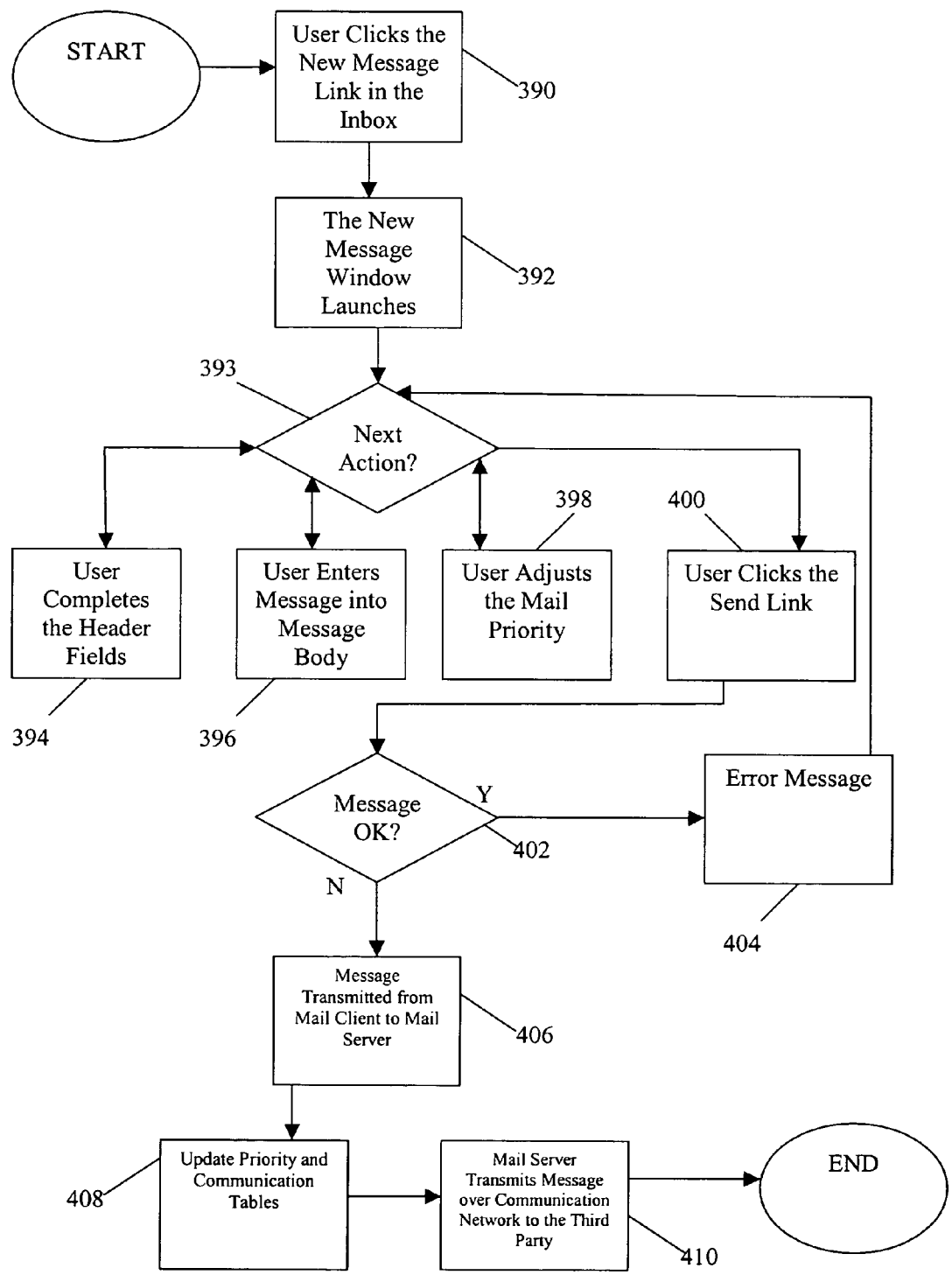
FIG. 25 is a flowchart of the method of the user sending a mail message of the present invention.

Referring to FIG. 25, the preferred method of the user sending mail message 70 to third party 18 is shown to comprise a first step 390 where the user clicks the new message link 34 in inbox 20. Thereafter, mail client 12 at step 392 launches new message window 22.

After the launching of new message window 22, mail client 12 waits for user action at decision point 393. The user from decision point 393 may complete mail to address 420 of mail message 70 at step 394 so that mail message 70 will have a recipient. From decision point 393, the user at step 396 may complete message body 424 and/or subject 60 by entering desired text for third party 18. The user from decision point 393 may also adjust priority group association 108 and/or priority interval 110 of mail message 70 at step 398.

It should be appreciated that upon the user's completion of mail to address 420 at step 394 that mail client 12 may optionally transmit such information to mail server 10 such that mail server 10 can lookup the recipient in priority table 90 to determine the priority group association 108 previously associated with that third party 18. Thereafter, mail server 10 would then transmit the previous priority group association 108 to mail client 12 so that mail client 12 could use the previous priority group association 108 with mail message 70 being generated at new message window 24.

The user at step 400 clicks the send link 428 upon completion of the composition of mail message 70. Thereafter, mail client 12 determines at decision point 402 whether there was an error in the user's composition of mail message 70. If yes, mail client 12 proceeds to step 404 to report to the error to the user, and thereafter returning to decision point 393 to provide the user with a further opportunity to compose mail message 70.

If there is no error at decision point 402, mail client 12 at step 406 transmits mail message 70 from mail client 12 to mail server 10. Thereafter, mail server 10 at step 408 updates priority table 90 and communication table 120 by adding a new priority table row 100 and communication table row 130 to track and monitor mail message 70.

Upon completion of step 408, mail server 10 transmits mail message 70 over communication network 8 to third party 18. However, if mail message 70 is for other user 19, mail server 10 simply provides other user 19 with access to mail message 70 through other user's inbox.

Figure 26:
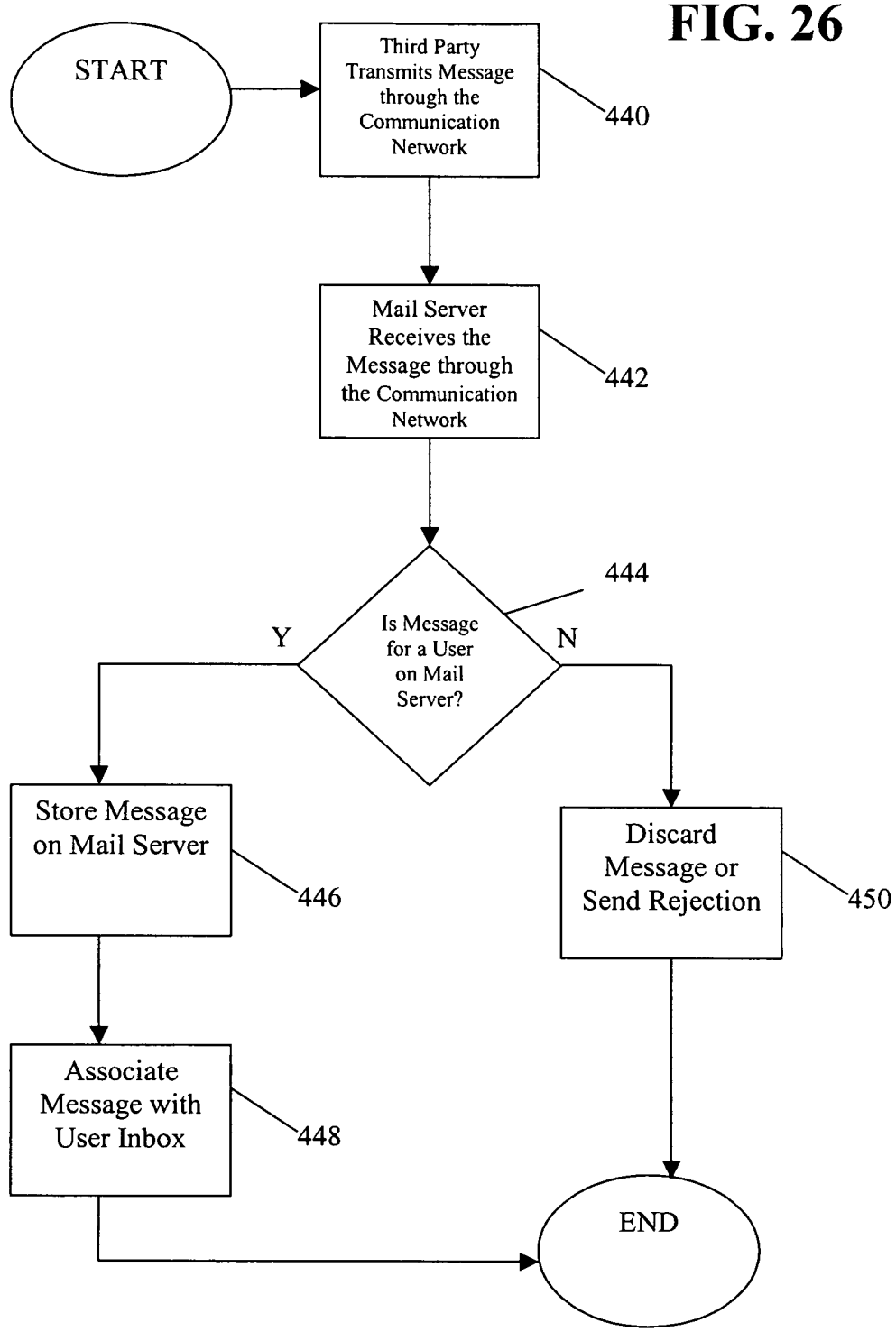
FIG. 26 is a flowchart of the method of the user receiving a mail message of the present invention.

Referring to FIG. 26, the preferred method of the user receiving mail message 70 from third party 18 is shown to comprise a first step 440 where third party 18 transmits mail message 70 through network connection 8 to the user. Mail server 10 at step 442 receives mail message 70 through network connection 8.

At decision point 444, mail server 10 determines whether mail message 70 is directed to a user of mail server 10. If no, mail server 10 at step 450 discards mail message 70 or transmits back to third party 18 a rejection message. If yes, mail server 10 at step 446 stores mail message 70 on computer server 4 associated with mail server 10. Thereafter, mail server 10 associates mail message 70 with inbox 20 of the user.

Figure 27:
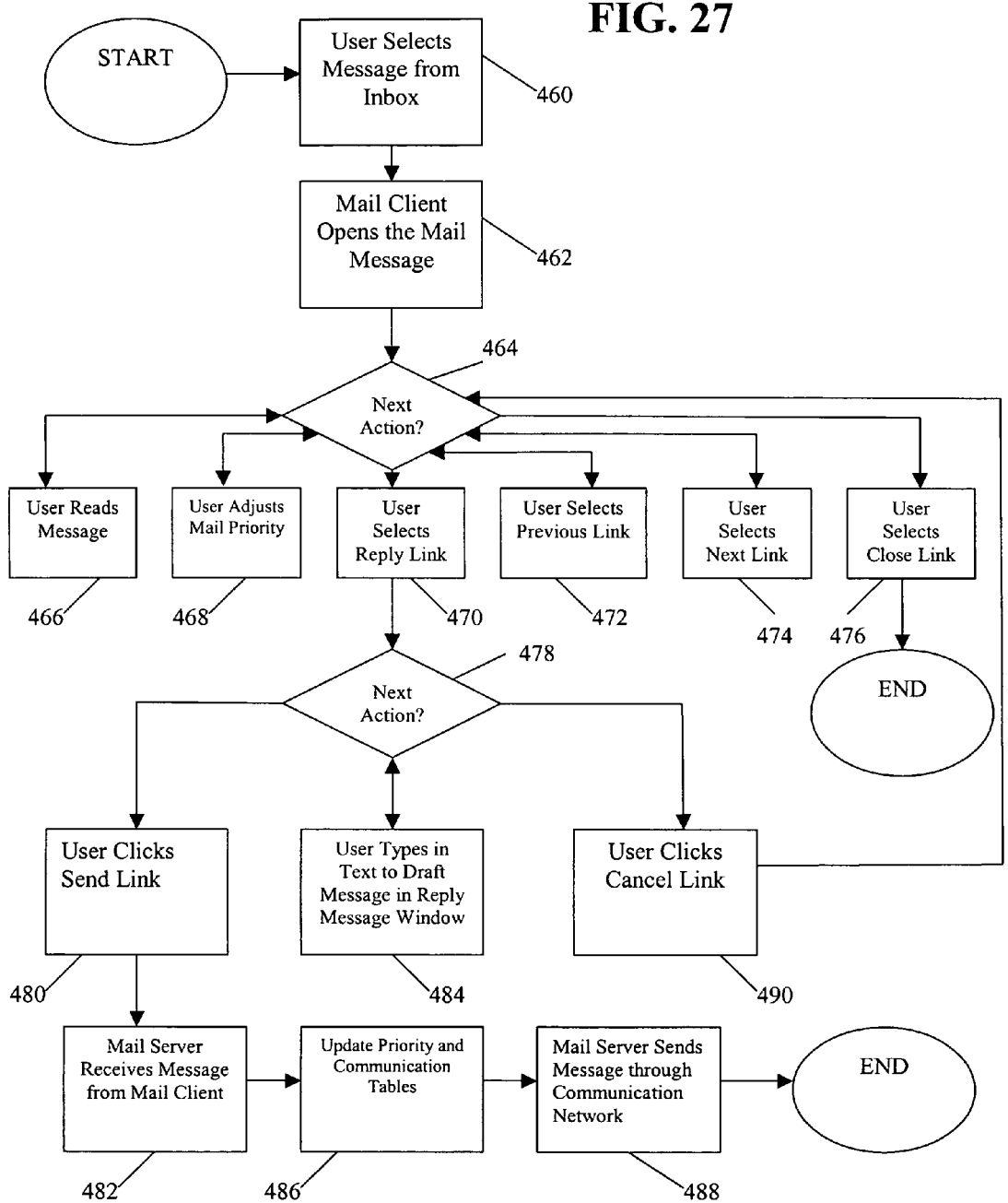
FIG. 27 is a flowchart of the method of the user reading/replying to a mail message of the present invention.

Referring to FIG. 27, the preferred method of the user reading and/or replying to mail message 70 is described in a first step 460 of the user selecting a specific mail message 70 from inbox 20. Thereafter, at step 462 mail client 12 opens mail message 70 and presents it to the user by means of read message window 24.

After the read message window 24 is launched, mail client 12 at decision point 464 awaits further interaction from the user before proceeding. The user from decision point 464 may proceed to step 466 whereat the user reads message text 74 of mail message 70. The user from decision point 464 may also proceed to step 468 to manually adjust the priority of mail message 70, the process of which is described in greater detail herein. The user may also navigate to the previous and next mail message 70 in inbox 20 by selecting previous link 514 and proceeding to step 472 or by selecting next link 512 and proceeding to step 474. If the user has finished reviewing mail message 70 and wishes to return to inbox 20 without responding to mail message 70, user selects close link 510 and proceeds to step 476.

However, if the user seeks to respond to mail message 70, the user clicks on reply link 470. Thereupon, mail client at step 470 launches reply message window 26 at step 470.

Mail client 12 then at decision point 478 awaits the next interaction from the user. If the user wishes to respond to mail message 70, the user proceeds to step 484 at which the user can enter desired text into message body 424 of reply message window 26. If the user wishes to cancel the response to the previously read mail message 70, the user proceeds to click cancel link 430 and thereafter returns to decision point 464 and read window 24.

If at decision point 478 the user seeks to transmit the response mail message 70, the user clicks the send link 428 and proceeds to step 480. Thereafter, mail server 10 at step 482 receives mail message 70 from mail client 12. Mail server 10 then at step 486 updates priority table row 100 and communication table row 130 associated with mail messages 70. Finally, mail server 10 at step 488 sends mail message 70 through communication network 8 to third party 18.

Figure 28:
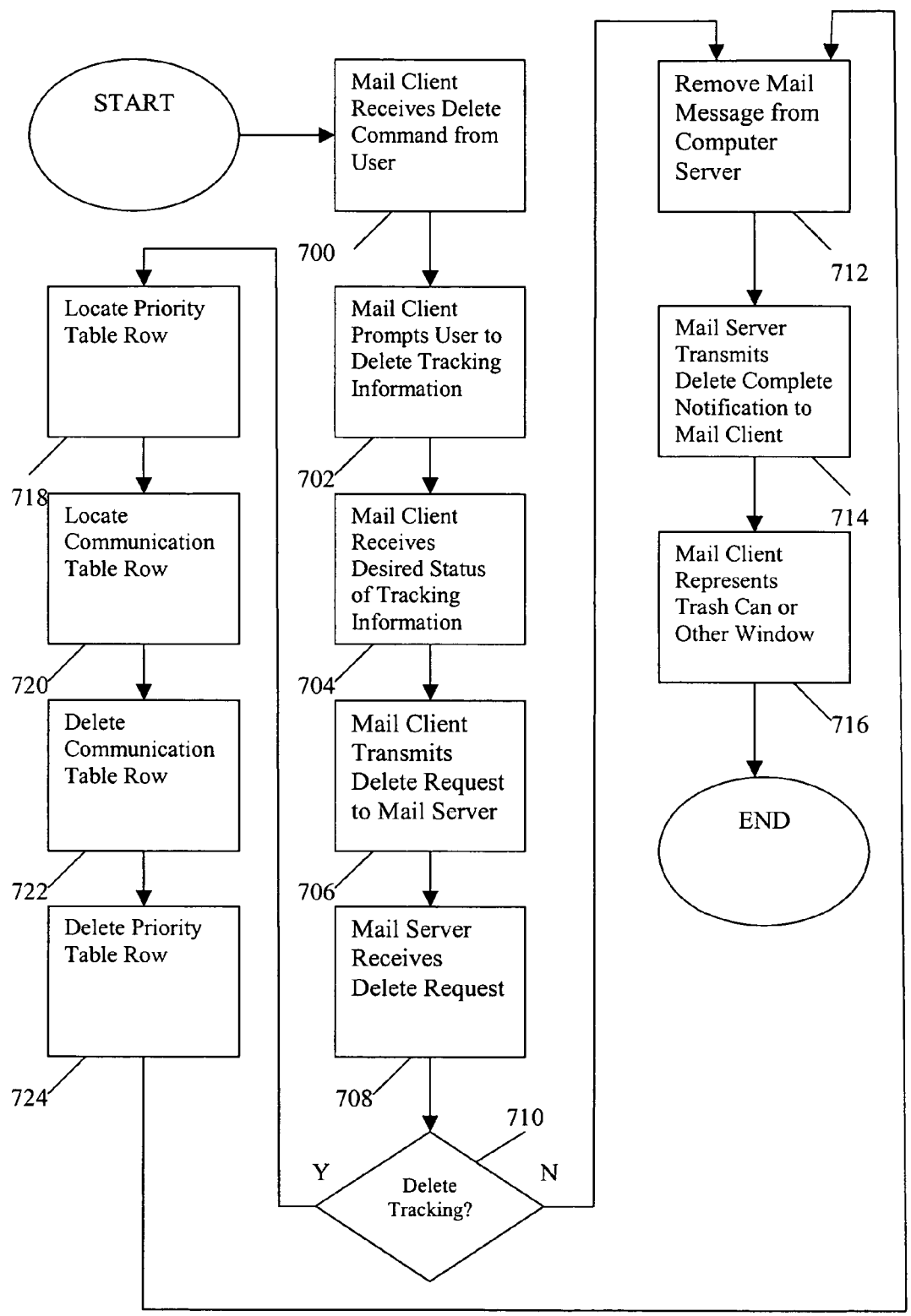
FIG. 28 is a flowchart of the method of deleting a mail message of the present invention.

Referring to FIG. 28, the preferred method for permanently deleting mail message 70 from message prioritization system 2 is comprised of first step 700 where mail client 12 receives a delete command from the user. Preferably, mail messages 70 are not permanently deleted when the user clicks on delete link 506 on read message window 24, but rather when user is reviewing the trash can from trash link 32.

Mail client 12 at step 702 prompts the user on whether the user wants to retain the monitoring and tracking information. Thereafter, at step 704 mail client 12 receives the user's indication on whether to retain the monitoring and tracking information. Mail client 12 at step 706 combines the monitoring and tracking request along with the identification of mail message 70 and sends a delete request to mail server 10.

Mail server 10 at step 708 receives the delete request from mail client 12. At decision point 710, mail server determines whether it is to delete the monitoring and tracking information associated with mail message 70. If no, mail server 10 proceeds to step 712 and removes mail message 70 from the respective computer server 4. Thereafter, mail server 10 transmits a delete complete notification to mail client 12. Thereafter, mail client 12 represents the trash can to the user without mail message 70. Alternatively, if the user can permanently delete mail message 70 from read message window 24, the read message window 24 represents itself with the next mail message 70 in inbox 20.

If at decision point 710 mail server 10 is to delete the monitoring and tracking information, mail sever 10 at step 718 locates priority table row 100 associated with mail message 70. Thereafter, at step 720, mail server 10 locates the associated communication table row 130 by use of communication table pointer 106. Mail server 10 then deletes communication table row 130 and priority table row at step 722 and step 724 respectively. Thereafter, mail server 10 proceeds to step 712 as described above.

Figure 29:
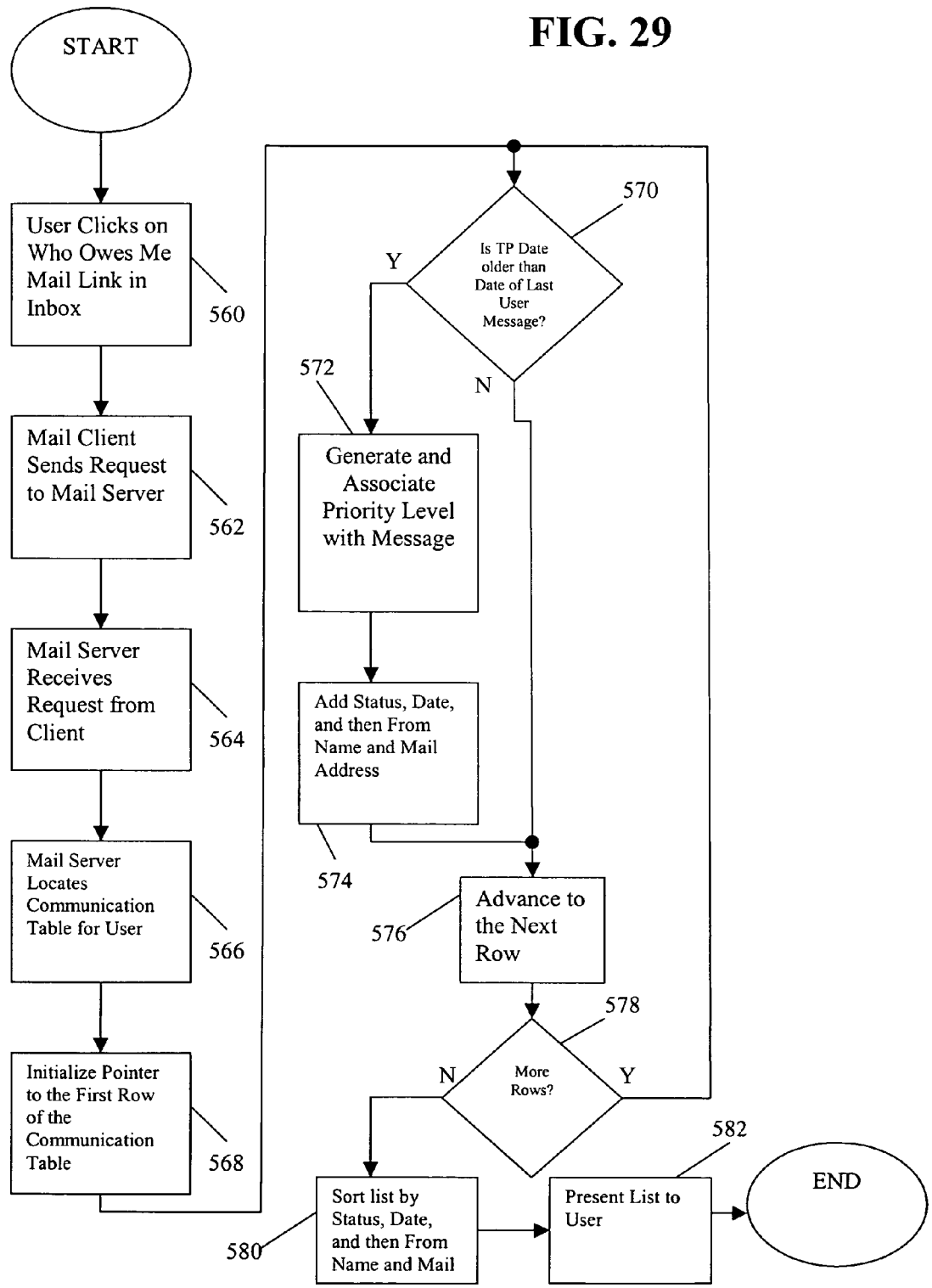
FIG. 29 is a flowchart of the method of generating a list of overdue third parties of the present invention.

Referring to FIG. 29, the preferred method of generating a list of third parties 18 and other users 19 that owe the user a mail message 70 is generated and presenting the list to the user is shown to first comprise a step 560 whereat the user clicks on who owes me mail link 38 in inbox 20. Upon completion of step 560, mail client 12 at step 562 proceeds to send a request to mail server 10 for information to generate the requested list.

Mail server 10 receives the request from mail client 12 at step 564. Thereafter, mail server 10 at step 566 locates the communication table 120 associated with the user. At step 568, mail server 10 initializes a pointer to the first communication table row 130 of communication table 120.

Mail server 10 at decision point 570 determines if date of last TP message 138 is older than date of last user message 136. If yes, then at step 572 mail server 10 generates and associates a priority level with mail message 70 by utilizing date of last TP message 138, the method of which is described in greater detail above. Thereafter, mail client 12 at step 574 receives all necessary information from mail server 10 to present a listing of mail messages 70 to the user in listing format such as found in inbox 20.

Mail server 10 at step 576 attempts to advance to the next communication table row 130 in communication table 120. Mail server 10 at decision point 578 determines if there is another communication table row 130 in communication table 120. If yes, mail server 10 returns to step 570. If no, mail server 10 transmits a completion request to mail client 12 and mail client 12 at step 580 sorts the list of mail messages 70 for presentation to the user. Thereafter, at step 582 the listing is presented to the user.

Figure 30:
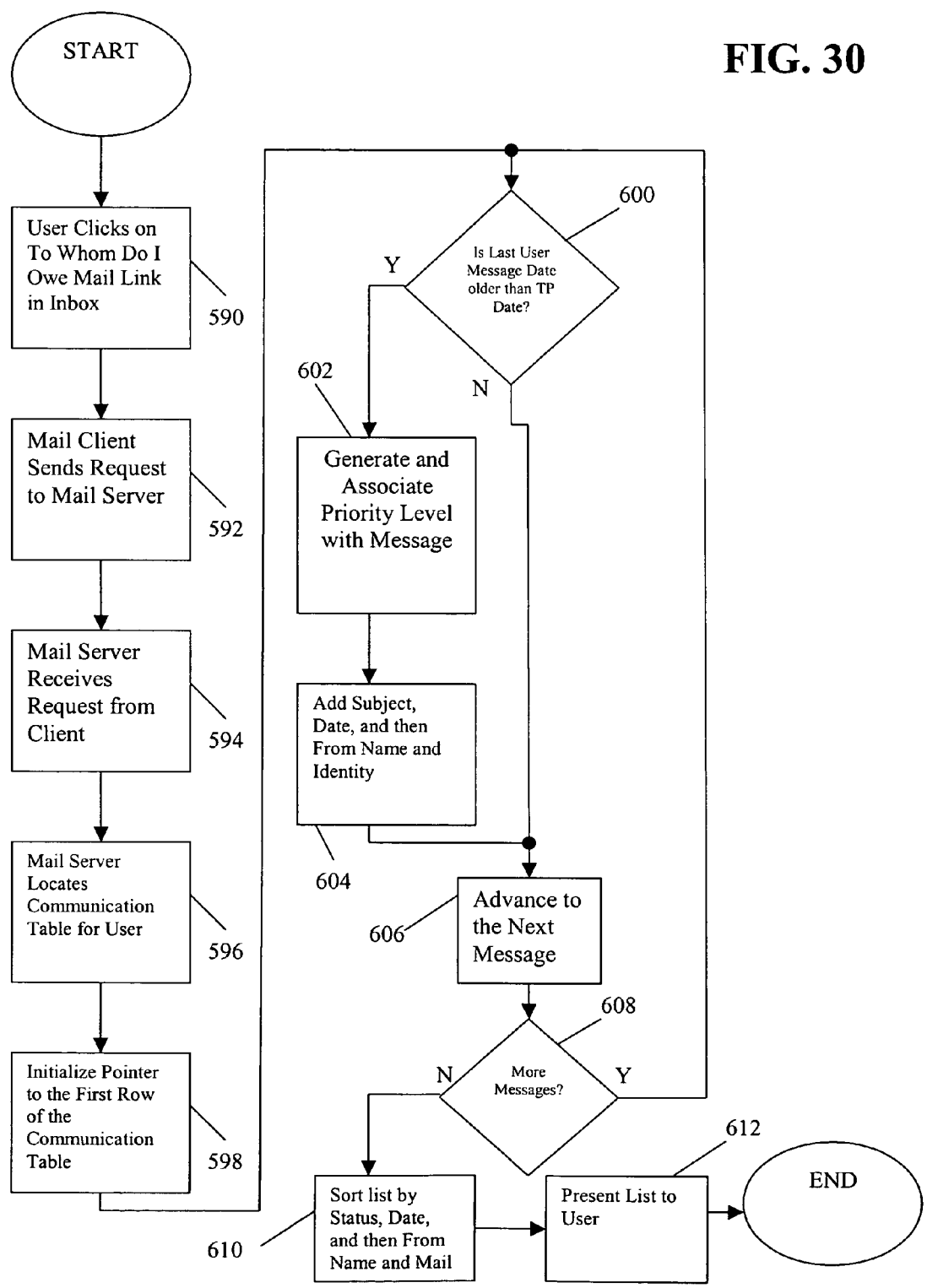
FIG. 30 is a flowchart of the method of generating a list of third parties that the user owes a mail message of the present invention.

Referring to FIG. 30, the preferred method of generating a list of third parties 18 and other users 19 that the user owes a message to is generated and presenting this list to the user is shown to first comprise a step 590 whereat the user clicks on to whom do I owe mail link 40 in inbox 20. Upon completion of step 590, mail client 12 at step 592 proceeds to send a request to mail server 10 for information to generate the requested list.

Mail server 10 receives the request from mail client 12 at step 594. Thereafter, mail server 10 at step 596 locates the communication table 120 associated with the user. At step 598, mail server 10 initializes a pointer to the first communication table row 130 of communication table 120.

Mail server 10 at decision point 600 determines if date of last user message 136 is older than date of last TP message 138. If yes, then at step 602 mail server 10 generates and associates a priority level with mail message 70 by date of last user message 136, the method of which is described in greater detail above. Thereafter, mail client 12 at step 604 receives all necessary information from mail server 10 to present a listing of mail messages 70 to the user in listing format such as found in inbox 20.

Mail server 10 at step 606 attempts to advance to the next communication table row 130 in communication table 120. Mail server 10 at decision point 608 determines if there is another communication table row 130 in communication table 120. If yes, mail server 10 returns to step 600. If no, mail server 10 transmits a completion request to mail client 12 and mail client 12 at step 610 sorts the list of mail messages 70 for presentation to the user. Thereafter, at step 612 the listing is presented to the user.

Figure 31:
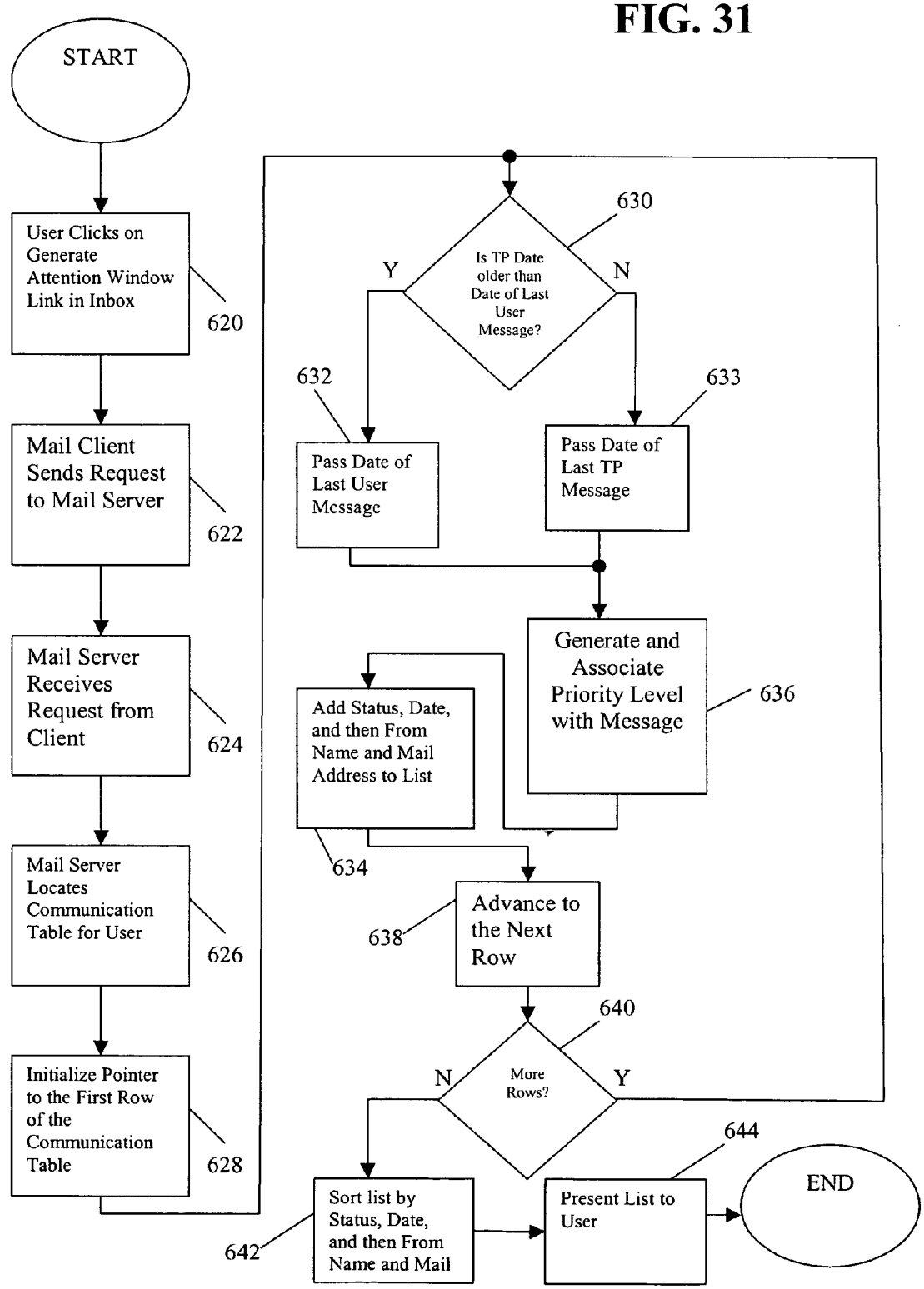
FIG. 31 is a flowchart of the method of presenting to the user the user attention window of the present invention.

Referring to FIG. 31, the preferred method of generating a user attention window is shown to first comprise a step 620 whereat the user clicks on generate attention window link 42 in inbox 20. The attention window of the present invention is a prioritized task list generated by message prioritization system 2 which not only tells the user what mail messages 70 should be responded to, but also in which order they should be responded. In addition, attention window is configured to alert the user of third parties 18 and other users 19 to which a mail message 70 is not necessarily owed, but identifies a person from which further communication is desired so as to keep in touch with that person. Upon completion of step 620, mail client 12 at step 622 proceeds to send a request to mail server 10 for information to generate the attention window.

Mail server 10 receives the request from mail client 12 at step 624. Thereafter, mail server 10 at step 626 locates the communication table 120 associated with the user. At step 628, mail server 10 initializes a pointer to the first communication table row 130 of communication table 120.

Mail server 10 at decision point 630 determines if date of last TP message 140 is older than date of last user message 134. If yes, mail server 10 proceeds to step 632 to utilize date of last user message 134 with the process for generating and associating a priority level with the message at step 636 as described above. If no, mail server 10 proceeds to step 633 to utilize date of last TP message 140 with the process for generating and associating a priority level with the message at step 636 as described above. Thereafter, mail client 12 at step 634 receives all necessary information from mail server 10 to present a listing of mail messages 70 to the user as is typically found in inbox 20.

Mail server 10 at step 638 attempts to advance to the next communication table row 130 in communication table 120. Mail server 10 at decision point 640 determines if there is another communication table row 130 in communication table 120. If yes, mail server 10 returns to step 630. If no, mail server 10 transmits a completion request to mail client 12 and mail client 12 at step 642 sorts the list of mail messages 70 for presentation to the user. Thereafter, at step 644 the listing is presented to the user.

Referring to FIG. 32, the preferred method of manual configuration of priority table 90 is shown to comprise first step 650 where mail server 10 loads priority table 90 associated with the user from priority database 14. Thereafter at step 652, mail server 10 transmits priority table 90 to mail client 12. Mail client 12 at step 654 presents a manual configuration window to the user, which is a visual representation of the priority table 90 so that user can view the values associated with each priority table row 100.

Mail client 12 at decision point 656 waits for further interaction from the user. User at step 658 may elect to add a new priority table row 100 to the priority table 90 by clicking on an appropriate link in the manual configuration window and entering in values in the appropriate positions of priority table row 100.

The user may also from decision point 656 proceed to step 660 by clicking on an appropriate link in the manual configuration window to modify an existing priority table row 100 of priority table 90, such as to adjust what priority table row 100 is monitoring.

The user from decision point 656 may also proceed to step 662 by clicking on an appropriate link in the manual configuration window to delete a priority table row 100 from priority table 90. Accordingly, no tracking information for previously associated mail messages 70 will be available to the user. When the user has completed modifications to priority table 90, user at decision point 656 clicks a link on the manual configuration window to proceed to step 664 and close the window and return to inbox 20 or the user's previous window.

It should be appreciated that elements designated as links in the description of the present invention may be implemented as buttons or other means of receiving interaction from the user.

It should also be appreciated from the foregoing description that if mail messages 70 are not stored on mail server 10 but instead on mail client 12, then portions of the foregoing method and system would occur on mail client 12 instead of mail server 10. For example, priority database 14 and communication database 16 would not be needed but mail client 12 would directly communication with priority table 90 and communication table 120.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method comprising:
   accessing, by a computer processor device, at least a portion of a header of a mail message sent by a mail sender to a mail receiver;
   comparing, by the computer processor device, the portion of the header of the mail message with user-defined match criteria to identify a match;
   selecting, by the computer processor device, a user-defined priority time interval among a plurality of available user-defined priority time intervals for the mail message based on the match of the portion of the header of the mail message, the user-defined priority time interval being a period of time defined by the mail receiver to respond to matching mail messages for which the match has been identified, a different user-defined priority time interval among the plurality of available user-defined priority time intervals having a different period of time defined by the mail receiver to respond to other matching mail messages for which a different match has been identified;
   determining, by the computer processor device, a time difference between a current time and a last action time associated with the mail message, the last action time being a time associated with the sending of the mail message from the mail sender to the mail receiver;
   determining, by the computer processor device, whether a response message has been sent by the mail receiver to the mail message that matches the portion of the header of the mail message;
   based on a determination that the response message has not been sent, calculating by the computer processor device, a number of times that the mail message is beyond the user-defined priority time interval based on the time difference;
   identifying, by the computer processor device, a priority level among a plurality of available priority levels for the mail message based on a calculation of the number of times the mail message is beyond the user-defined priority time interval, the priority level identifying a level of how overdue a response by the mail receiver is to the mail message;
   identifying, by the computer processor device, a pictorial representation among a plurality of available pictorial representations to represent the priority level of the mail message, a first pictorial representation including a first facial expression and a second pictorial representation including a second facial expression; and generating, by the computer processor device, a display associated with the mail receiver including the pictorial representation in association with indicia of the mail message.

2. The method of claim 1, further comprising:

receiving, by the computer processor device, the mail message;

identifying, by the computer processor device, the mail sender of the mail message;

determining, by the computer processor device, that the mail receiver of the mail message has a relationship with the mail sender, the mail receiver having acknowledged the relationship; and prioritizing, by the computer processor device, the mail message for the mail receiver based on a determination that the mailer receiver has the relationship with the mail sender, wherein generation of the display is based on prioritization of the mail message.

3. The method of claim 1, further comprising:

receiving a message matching selection from the mail receiver, wherein the portion of the header is based on the message matching selection.

4. The method of claim 1, further comprising:

receiving a response timing selection from the mail receiver, wherein the period of time associated with the priority interval is based on the response timing selection.

5. A method comprising:

accessing, by a computer processor device, at least a portion of a header of a mail message sent by a mail sender to a mail receiver;

comparing, by the computer processor device, the portion of the header of the mail message with user-defined match criteria to identify a match;

selecting, by the computer processor device, a user-defined priority time interval among a plurality of available user-defined priority time intervals for the mail message based on the, the user-defined priority time interval being a period of time defined for the mail receiver to respond to matching mail messages for which the match has been identified, a different user-defined priority time interval among the plurality of available user-defined priority time intervals having a different period of time defined by the mail receiver to respond to other matching mail messages for which a different match has been identified;

determining, by the computer processor device, a time difference between a current time and a last action time associated with the mail message, the last action time being a time associated with the sending of the mail message from the mail sender to the mail receiver;

determining, by the computer processor device, whether a response message has been received by the mail sender to the mail message that matches the portion of the header of the mail message;

based on a determination that the response message has not been received, calculating, by the computer processor device, a number of times that the mail message is beyond the user-defined priority time interval based on the time difference;

identifying, by the computer processor device, a priority level among a plurality of available priority levels for the mail message based on a calculation of the number of times the mail message is beyond the priority time interval, the priority level identifying a level of how overdue a response by the mail receiver is to the mail message;

identifying, by the computer processor device, a pictorial representation among a plurality of available pictorial representations to represent the priority level of the mail message, a first pictorial representation including a first facial expression and a second pictorial representation including a second facial expression; and generating, by the computer processor device, a display associated with the mail sender including the pictorial representation in association with indicia of the mail message.

6. The method of claim 5, further comprising:

receiving a message matching selection from the mail sender, wherein the portion of the header is based on the message matching selection.

7. The method of claim 5, further comprising:

receiving a response timing selection from the mail sender, wherein the period of time associated with the priority interval is based on the response timing selection.

8. A non-transitory machine-readable medium comprising instructions, which when implemented by one or more processors, perform the following operations:

access at least a portion of a header of a mail message sent by a mail sender to a mail receiver;

compare the portion of the header of the mail message with user-defined match criteria to identify a match;

select a user-defined priority time interval among a plurality of available user-defined priority time intervals for the mail message based on the match, the user-defined priority time interval being a period of time defined by the mail receiver to respond to the mail message matching mail messages for which the match has been identified, a different user-defined priority time interval among the plurality of available user-defined priority time intervals having a different period of time defined by the mail receiver to respond to matching mail messages for which a different match has been identified;

determine a time difference between a current time and a last action time associated with the mail message, the last action time being a time associated with the sending of the mail message from the mail sender to the mail receiver;

determine whether a response message has been sent by the mail receiver to the mail message that matches the portion of the header of the mail message;

based on a determination that the response message has not been sent, calculate a number of times that the mail message is beyond the user-defined priority time interval based on the time difference;

identify a priority level among a plurality of available priority levels for the mail message based on a calculation of the number of times the mail message is beyond the user-defined priority time interval, the priority level identifying a level of how overdue a response by the mail receiver is to the mail message;

identify a pictorial representation among a plurality of available pictorial representations to represent the priority level of the mail message, a first pictorial representation including a first facial expression and a second pictorial representation including a second facial expression; and generate a display associated with the mail receiver including the pictorial representation in association with indicia of the mail message.

9. The method of claim 1, wherein the plurality of available priority levels include a zero priority level, a first priority level, a second priority level, and a third priority level, the zero priority level reflecting a calculation that the mail message is within an amount of time designated by the user-defined priority time interval, the first priority level reflecting a calculation that the mail message is equal to or greater than the amount of time designated by the user-defined priority time interval and less than two times beyond the amount of time designated by the user-defined priority time interval, the second priority level reflecting a calculation that the mail message is equal to or greater than two times beyond the amount of time designated by the user-defined priority time interval and less than three times beyond the amount of time designated by the user-defined priority time interval, and the third priority level reflecting a calculation that the mail message is equal to or greater than three times beyond the amount of time designated by the user-defined priority time interval and less than four times beyond the amount of time designated by the user-defined priority time interval.

* * * * *